United States Patent
Hogan et al.

(10) Patent No.: US 7,299,222 B1
(45) Date of Patent: Nov. 20, 2007

(54) ENHANCED SEARCH RESULTS

(75) Inventors: David Hogan, Leesburg, VA (US); W. Karl Renner, Great Falls, VA (US)

(73) Assignee: AOL LLC, Dulles, VA (US)

( * ) Notice: Subject to any disclaimer, the term of this patent is extended or adjusted under 35 U.S.C. 154(b) by 589 days.

(21) Appl. No.: 10/747,698

(22) Filed: Dec. 30, 2003

(51) Int. Cl.
G06F 7/00 (2006.01)
(52) U.S. Cl. .................................. 707/3; 707/6
(58) Field of Classification Search .............. 707/1–10, 707/101, 100
See application file for complete search history.

(56) References Cited

U.S. PATENT DOCUMENTS

| | | | |
|---|---|---|---|
| 6,643,641 B1 * | 11/2003 | Snyder | 707/4 |
| 6,990,628 B1 * | 1/2006 | Palmer et al. | 715/500 |
| 2003/0188263 A1 * | 10/2003 | Bates et al. | 715/513 |
| 2004/0220897 A1 * | 11/2004 | Bernhart et al. | 707/1 |
| 2005/0055340 A1 * | 3/2005 | Dresden | 707/3 |

OTHER PUBLICATIONS

OpenCOLA[Welcome!], "OpenCOLA Developer's Release 0.1", reprinted from http://web.archive.org/web/20001118053400://http:www.opencola.com printed on Dec. 23, 2003 (2 pages).
OpenCOLA[Software], "openCOLA™: The Platform", reprinted from http://web.archive.org/web/20001110010400/www.opencola.com/software/index.html printed on Dec. 23, 2003 (2 pages).
OpenCOLA[COLAlounge], "COLAlounge", reprinted on http://web.archive.org/web/20010223193855/www.opencola.com/colalounge/ printed on Dec. 23, 2003 (1 page).
Howstffworks How Internet Search Engines Work, "How Internet Search Engines Work", reprinted from http://computer.howstuffworks.com/search-engine.htm printed on Dec. 29, 2003 (3 pages).
Howstffworks How Internet Search Engines Work, "Looking at the Web", reprinted from http://computer.howstuffworks.com/search-engine1.htm printed on Dec. 29, 2003 (3 pages).
Howstffworks How Internet Search Engines Work, "Building the Index", reprinted from http://computer.howstuffworks.com/search-engine2.htm printed on Dec. 29, 2003 (3 pages).
Howstffworks How Internet Search Engines Work, "Building a Search", reprinted from http://computer.howstuffworks.com/search-engine3.htm printed on Dec. 29, 2003 (3 pages).
Howstffworks How Internet Search Engines Work, "Future Search", reprinted from http://computer.howstuffworks.com/search-engine4.htm printed on Dec. 29, 2003 (3 pages).
Howstffworks How Internet Search Engines Work, "Lots More Information", reprinted from http://computer.howstuffworks.com/search-engine5.htm printed on Dec. 29, 2003 (3 pages).
How the Internet Works, "Terms to Know", Spring 2001, p. 217.
Boston.com / Business / New search engine taps into social networks, New search engine taps into social networks, reprinted from http://www.boston.com/busomess/globe/articles/2004/01/21/new_search_engine_taps_into_s...printed on Feb. 2, 2004 (2 pages).

* cited by examiner

*Primary Examiner*—Wilson Lee
(74) *Attorney, Agent, or Firm*—Fish & Richardson P.C.

(57) ABSTRACT

A search tool graphical user interface comprises search criteria selected by an operator of the search tool. One or more search results that correspond to the search criteria are displayed on the search tool graphical user interface, and an indication of characteristics is displayed for one or more of the search results. The characteristics displayed may include the availability or maturity of content associated with the search results. The search results may be sorted or filtered based on the characteristics of content associated with the search results. The characteristics may be determined before or after the search results are identified and displayed on the search tool graphical user interface.

39 Claims, 19 Drawing Sheets

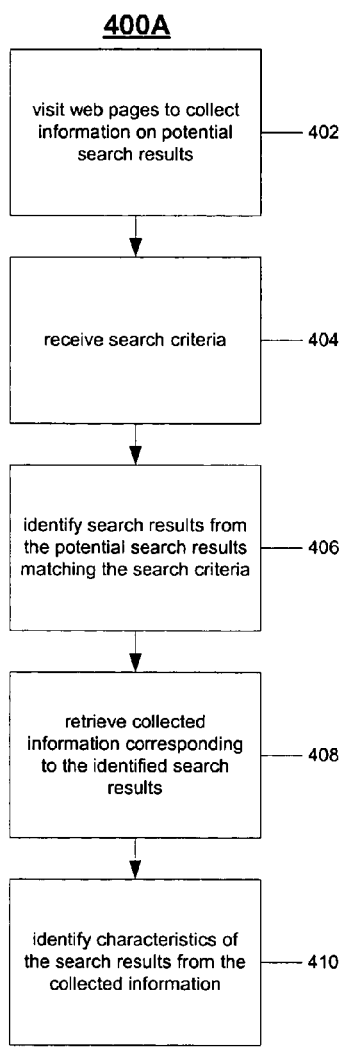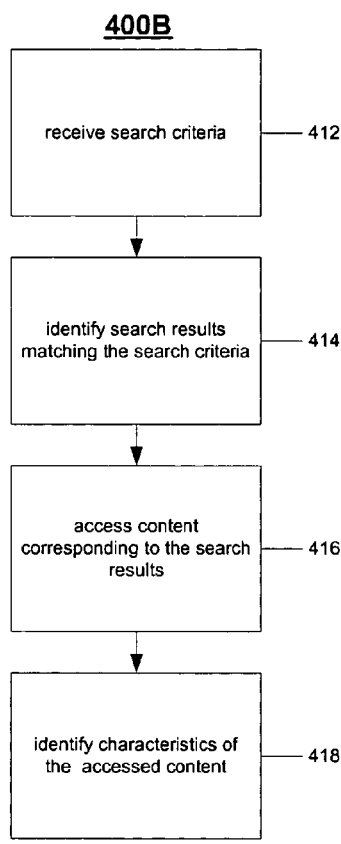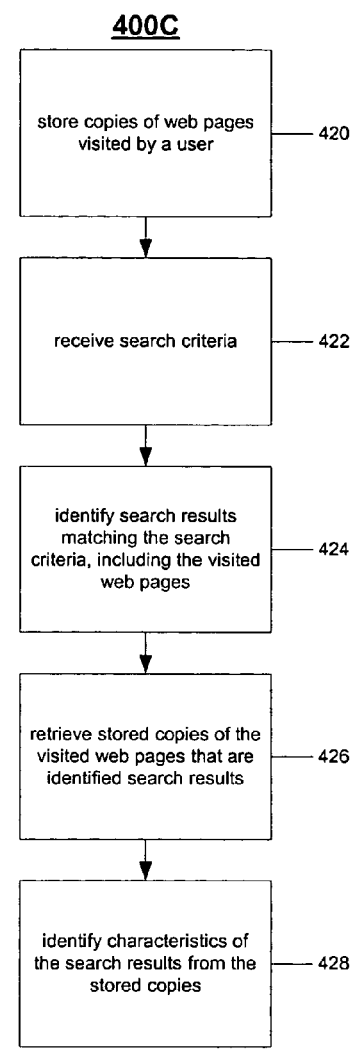
Figure 4A
Figure 4B
Figure 4C

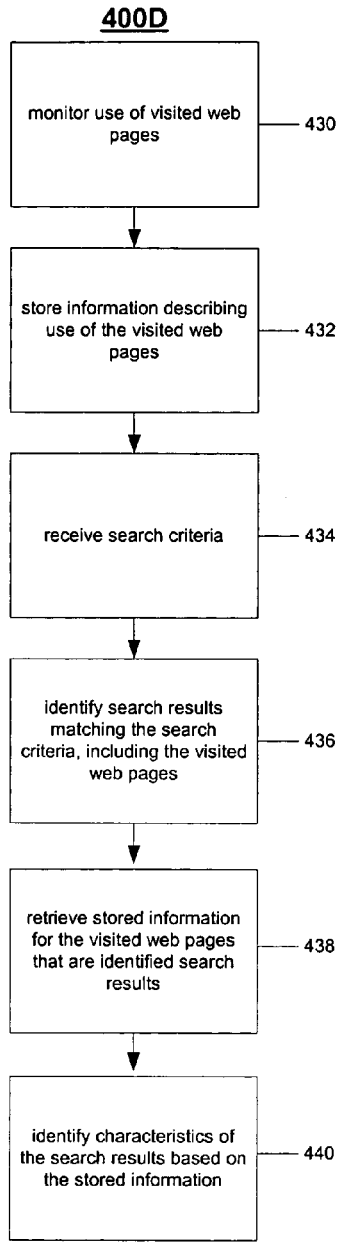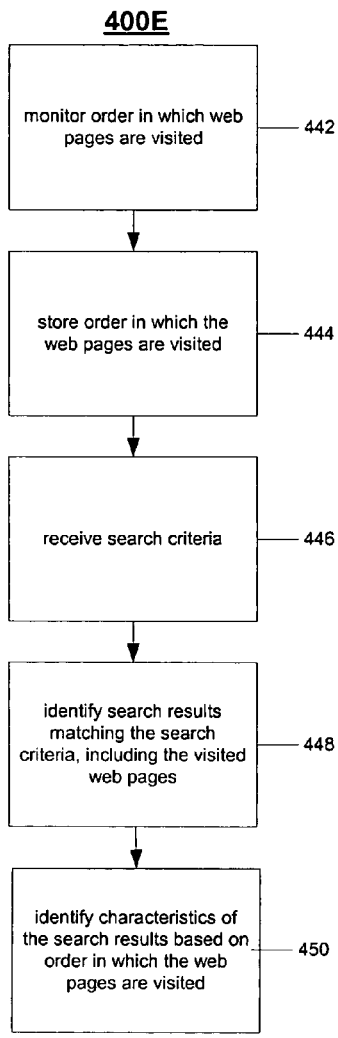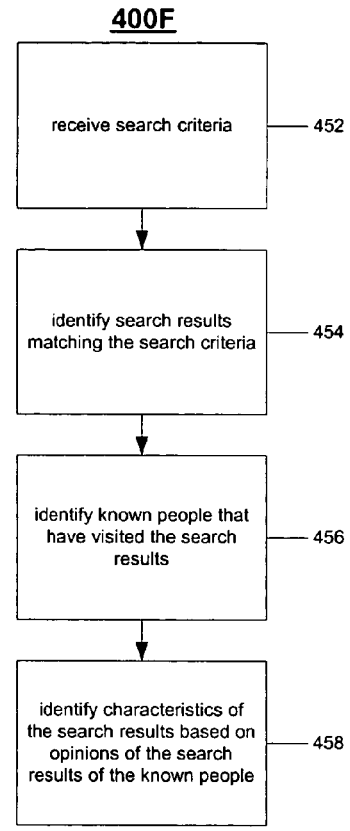
Figure 4D
Figure 4E
Figure 4F

# ENHANCED SEARCH RESULTS

TECHNICAL FIELD

This invention relates to search engines, and more particularly, to displaying information describing search results.

BACKGROUND

Conventional search engines retrieve a set of search results that correspond to entered search criteria. The search results may be presented with a title of each result, as well as a summary and location of each search result. A user may choose a search result based on the information present by the search engine. The chosen search result may direct the user to content that does not interest the user, even though the search result matched the entered search criteria. The information presented by the search engine may limit the user's ability to accurately and completely assess the accessed search result.

SUMMARY

In one general aspect, a search tool graphical user interface comprises search criteria selected by an operator of the search tool. The search tool graphical user interface also includes one or more search results that correspond to the search criteria and an indication of availability of content corresponding to the one or more search results.

Implementations may include one or more of the following features. For example, indication of availability may include a textual message proximate to the search result for which the indication of availability is being rendered. The indication of availability may include a graphical icon proximate to the search result for which the indication of availability is being rendered. The icon may be selectable to reveal text describing the availability of content corresponding to the search result for which the indication of availability is being rendered.

The indication of availability may include an ordering of search results, and the ordering may include search results corresponding to available content before search results corresponding to unavailable content. The ordering may include display of a heading that distinguishes search results corresponding to available content from search results corresponding to unavailable content.

The indication of availability may include display of search results corresponding to available content and purposeful omission from display of search results corresponding to unavailable content.

In another general aspect, a search tool graphical user interface comprises search criteria selected by an operator of the search tool. The search tool graphical user interface also includes one or more search results that correspond to the search criteria, and an indication of maturity of content corresponding to the one or more search results.

Implementations may include one or more of the following features. For example, the indication of maturity may include a textual message proximate to the search result for which the indication of availability is being rendered. The indication of maturity may include a graphical icon proximate to the search result for which the indication of availability is being rendered. The icon may be selectable to reveal text describing the maturity of content corresponding to the search result for which the indication of maturity is being rendered.

The indication of maturity may include an ordering of search results, and the ordering may include search results corresponding to content appropriate for minors before search results corresponding to content inappropriate for minors. The ordering may include display of a heading that distinguishes search results corresponding to content appropriate for minors from search results corresponding to content inappropriate for minors.

The indication of availability may include display of search results corresponding to content inappropriate for minors and purposeful omission from display of search results corresponding to content inappropriate for minors.

In another general aspect, a search tool graphical user interface comprises search criteria selected by an operator of the search tool. The search tool graphical user interface also includes one or more search results that correspond to the search criteria, and an indication of characteristics displayed for one or more of the search results.

Implementations may include one or more of the following features. For example, an indication of characteristics may be displayed for each of the search results. The characteristics may include an availability for display of content in response to selection of the search result such that at least one of the search results is displayed with an indication that content corresponding to the search result is available for display in response to selection of the search result. The characteristics may include a presence of advertisements such that at least one of the search results is displayed with an indication of the presence of advertisements that will be rendered upon selection of content corresponding to the at least one of the search results. The advertising may include pop-up advertisements, pop-under advertisements, or rich media advertisements.

The characteristics may include an age appropriateness such that at least one of the search results is displayed with an indication of the age appropriateness of content corresponding to the at least one of the search results. The characteristics may include a file type such that at least one of the search results is displayed with an indication of the file type included in content to be rendered in response to selection of the at least one of the search results. The characteristics may include a presence of multimedia content such that at least one of the search results is displayed with an indication of the presence of multimedia content included in content to be rendered in response to selection of the at least one of the search results.

The characteristics may include sources of the one or more search results such that at least one of the search results is displayed with an indication of the source of content to be rendered in response to selection of the at least one search result. The source may include a message board, a discussion forum, or a web page. The characteristics may include a metric related to people known to the user that have viewed the search results such that at least one search result is displayed with an indication of the known people that have viewed content corresponding to the search result.

The indication of the characteristics may include a textual message proximate to the search result for which a characteristics indication is being rendered. The indication of the characteristics may include a graphical icon proximate to the search result for which a characteristics indication is being rendered. The icon may be selectable to reveal text describing the characteristics of the search result for which the icon is rendered. The icon may be selectable to reveal text describing the means of identifying the characteristics of the search result for which the icon is rendered. The indication of the characteristics may include multiple graphical icons proximate to the search result for which the multiple graphical icons are displayed. Each of the multiple graphical icons may be selectable to reveal text describing the characteristics of the search result for which the multiple graphical icons are rendered represented.

The indication of the characteristics may include an ordering of the search results. Ordering may include display of a heading that distinguishes at least one set of search results from another based on the characteristics therefore. Ordering may include newly discovered search results before previously displayed search results yielded from a prior search of the search criteria. Ordering may include search results corresponding to available content before search results corresponding to unavailable content.

Ordering may include search results corresponding to age appropriate content before search results corresponding to age inappropriate content. Ordering may include search results corresponding to content without advertisements before search results corresponding to content with advertisements. Ordering may include search results corresponding to content of a first file type displayed before search results corresponding to content of a second file type.

Ordering may include search results corresponding to content with multimedia content before search results corresponding to content without multimedia content. Ordering may include search results corresponding to content without multimedia content before search results corresponding to content with multimedia content. Ordering may include search results corresponding to content from a first source displayed before search results corresponding to content from a second source. Ordering may include search results corresponding to content that has been viewed by a higher number of known people before search results corresponding to content that has been viewed by a lower number of known people.

The indication of the characteristics may include display of search results corresponding to content that is available and purposeful omission from the display of search results corresponding to content that is not presently available. The indication of the characteristics may include display of search results corresponding to age appropriate content and purposeful omission from display of search results corresponding to age inappropriate content. The indication of the characteristics may include display of search results corresponding to content without advertisements and purposeful omission from display of search results corresponding to content with advertisements. The indication of the characteristics may include display of search results corresponding to content of a first file type displayed and purposeful omission from display of search results corresponding to content of a second file type.

The indication of the characteristics may include display of search results corresponding to content with multimedia content and purposeful omission from display of search results corresponding to content without multimedia content. The indication of the characteristics may include display of search results corresponding to content without multimedia content and purposeful omission from display of search results corresponding to content with multimedia content. The indication of the characteristics may include display of search results corresponding to content from a first source displayed and purposeful omission from display of search results corresponding to content from a second source. The indication of the characteristics may include display of search results corresponding to content that has been viewed by a number of known people above a threshold and purposeful omission from display of search results corresponding to content that has been viewed by a number of known people below the threshold.

In another general aspect, a method for indicating characteristics of search results includes receiving search criteria to be applied against one or more data stores and identifying one or more search results that correspond to the search criteria. The method also includes identifying characteristics of individual of the one or more search results and displaying the search results with an indication of the characteristics of at least one of the search results.

Implementations may include one or more of the following features. For example, the method may further comprise sorting the search results based on the characteristics of each search result. The method may further comprise purposefully omitting from display search results based on the characteristics of the omitted search results.

Identifying characteristics of each of the one or more search results may comprise gathering information related to the one or more search results and analyzing the gathered information to determine the characteristics of each of the one or more search results.

Gathering information related to search may comprise accessing the one or more search results, identifying tokens describing the search results, and storing the identified tokens.

Identifying the characteristics of each of the one or more search results may occur before the search results are identified as corresponding to the search criteria. Identifying the characteristics of each of the one or more search results may occur after the search results are displayed.

Identifying the characteristics of each of the one or more search results comprises visiting each of the one or more search results and identifying the characteristics of each of the one or more search results based on the visit.

Identifying the characteristics of each of the one or more search results may comprise identifying the characteristics of each of the one or more search results based on information regarding each of the one or more search results gathered before the search results are displayed. The information regarding each of the one or more search results may comprise an identification of pages viewed before and after each of the one or more search results. The information regarding each of the one or more search results may comprise an identification of content of each of the one or more search results. The information regarding each of the one or more search results may comprise an identification of how each of the one or more search results was used.

Identifying the characteristics of each of the one or more search results may comprise identifying people that have viewed each of the one or more search results and identifying the characteristics of each of the one or more search results based on the people that have viewed each of the one or more search results.

The details of one or more implementations are set forth in the accompanying drawings and the description below. Other features will be apparent from the description and drawings, and from the claims.

DESCRIPTION OF DRAWINGS

FIGS. 4A-4F are flow charts of processes for identifying characteristics of content corresponding to search results.

Like reference symbols in the various drawings indicate like elements.

DETAILED DESCRIPTION

Figure 1A:
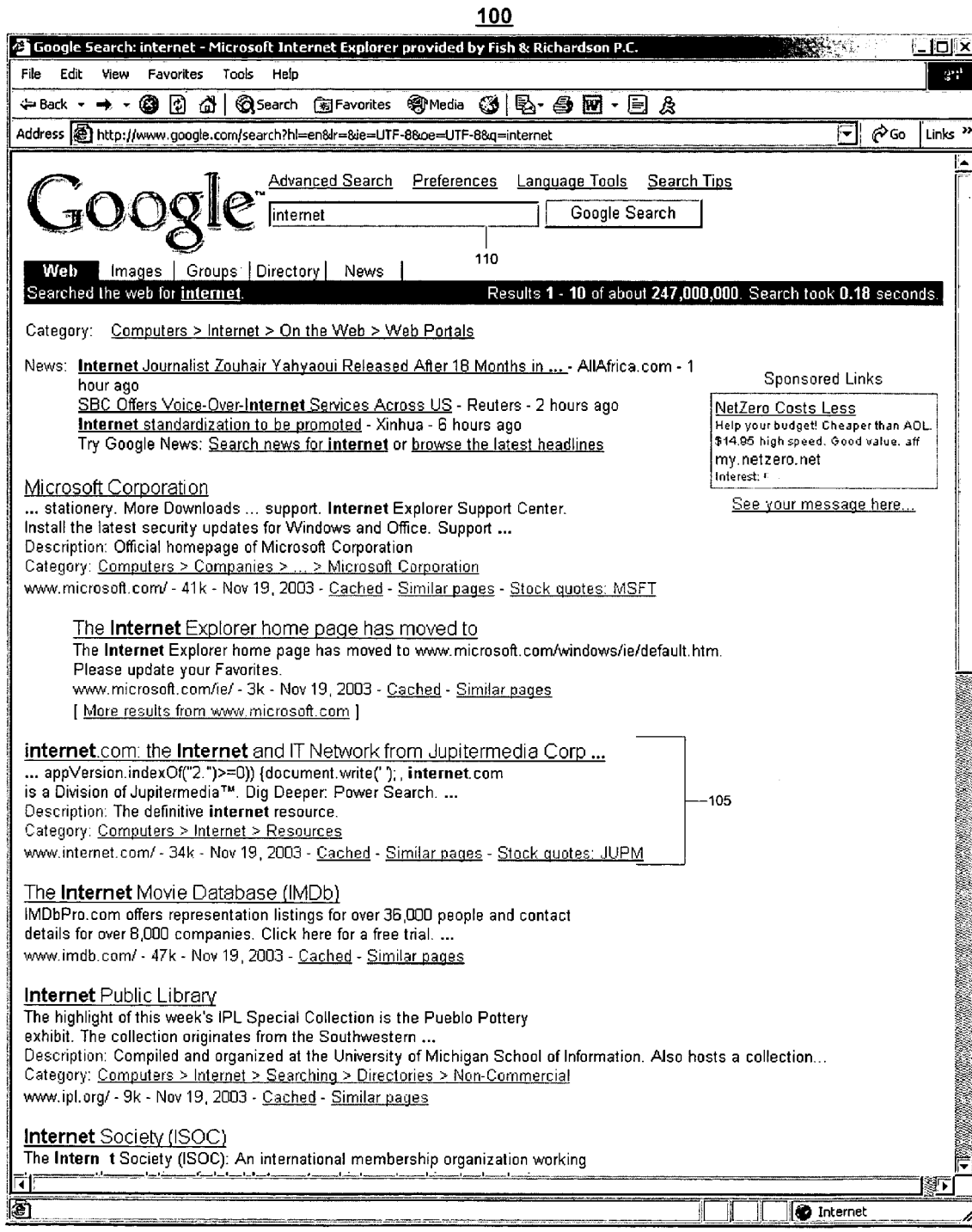
FIGS. 1A-1E are illustrations of conventional search engine interfaces.
Figure 1B:
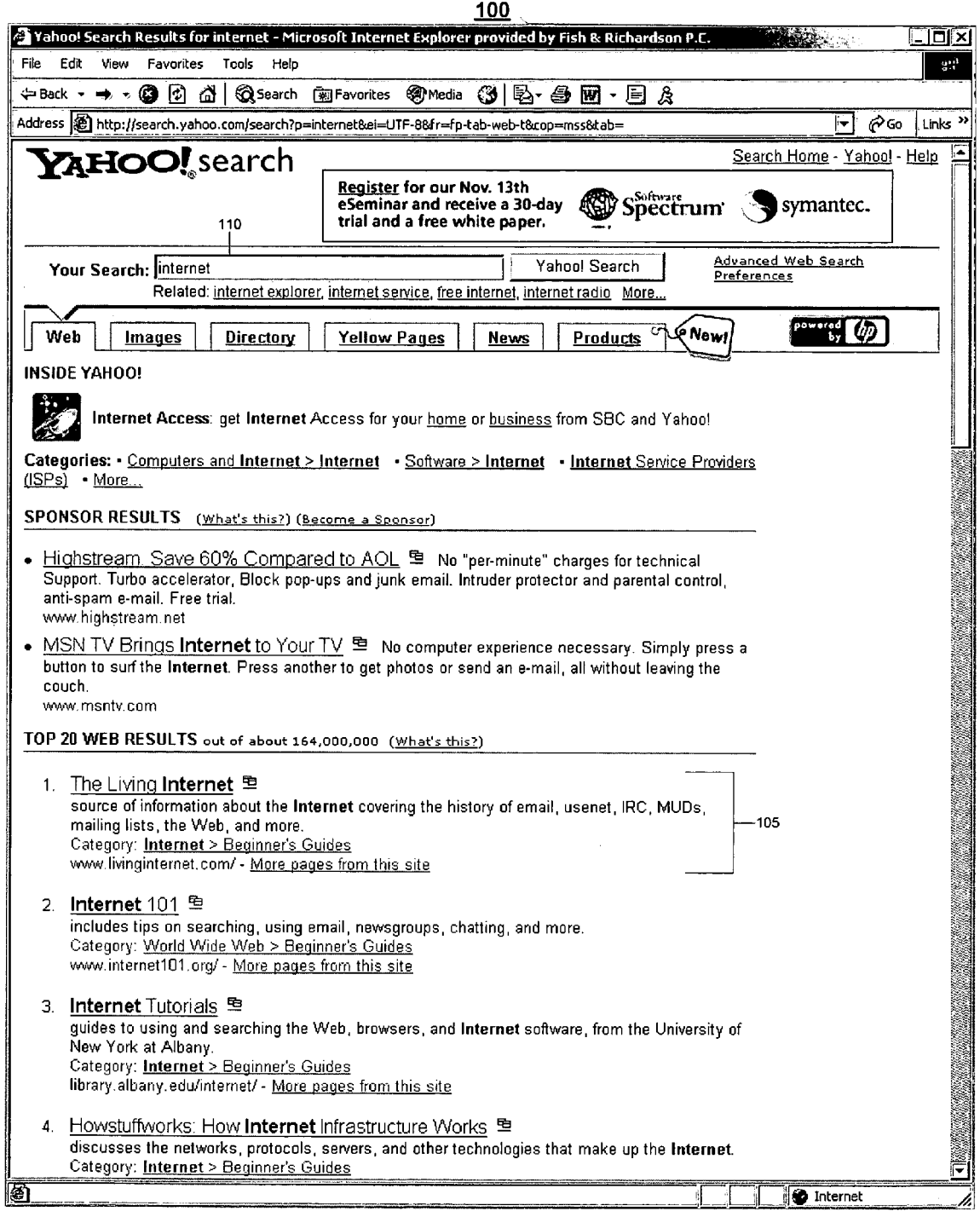
Figure 1C:
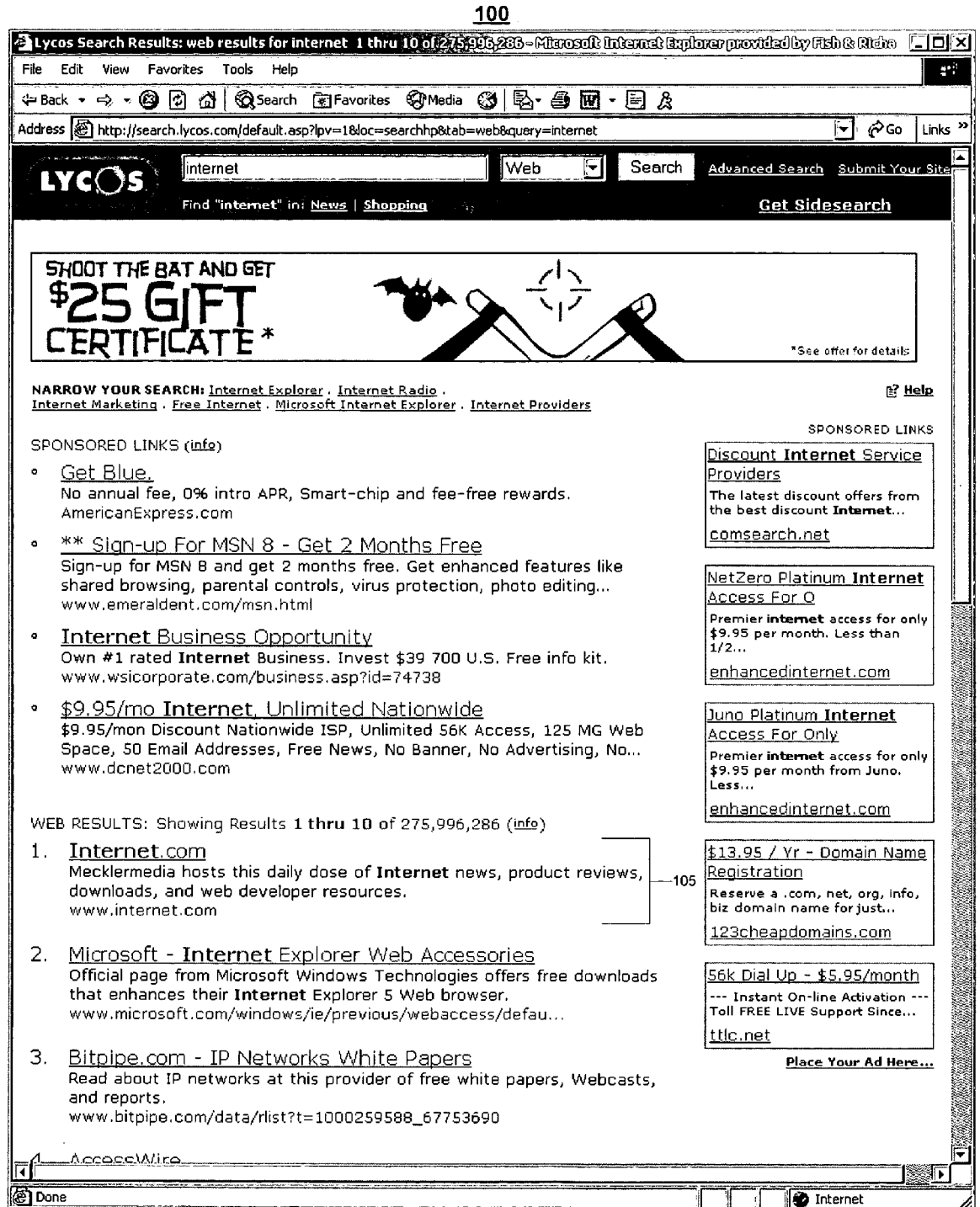
Figure 1D:
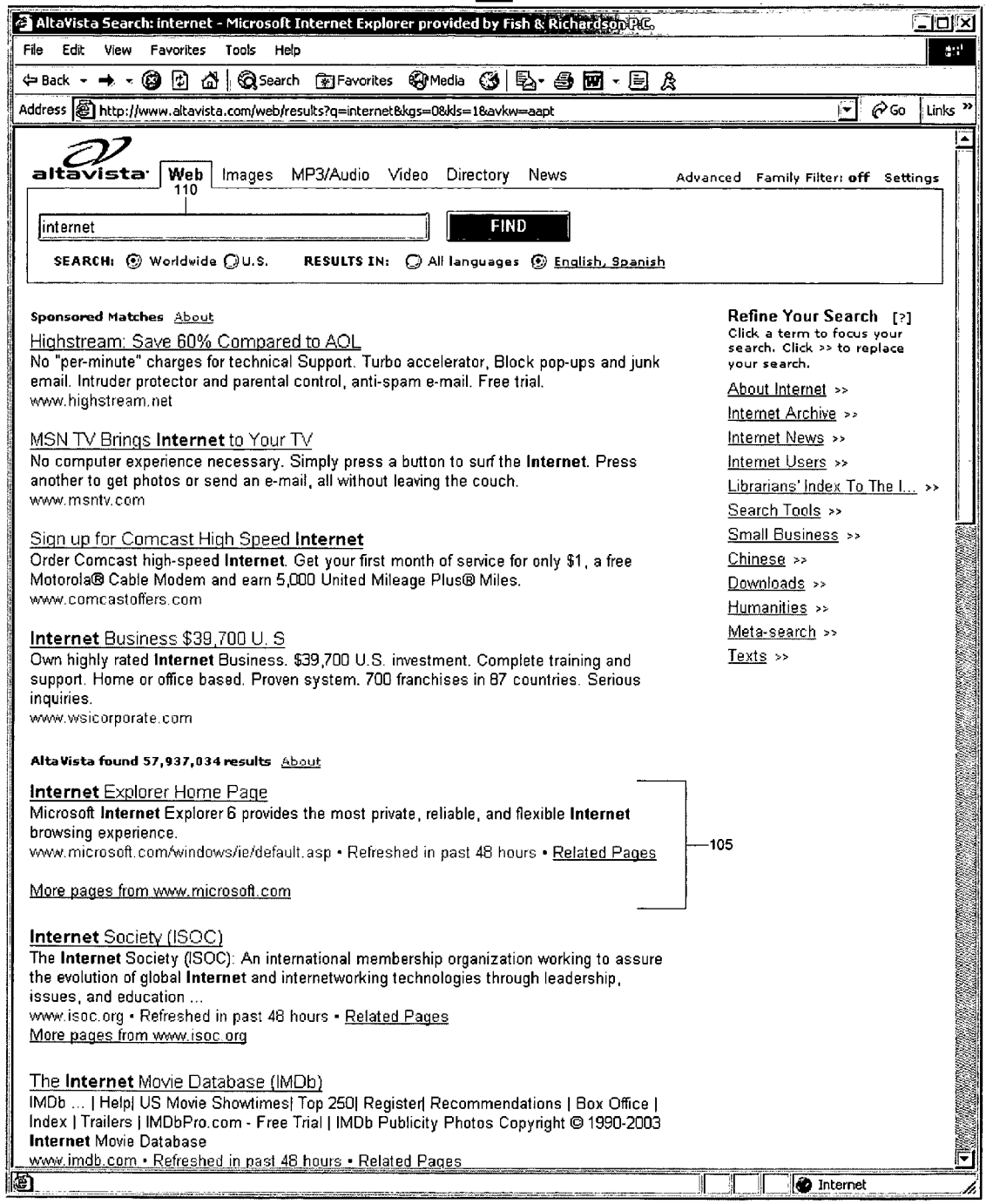
Figure 1E:
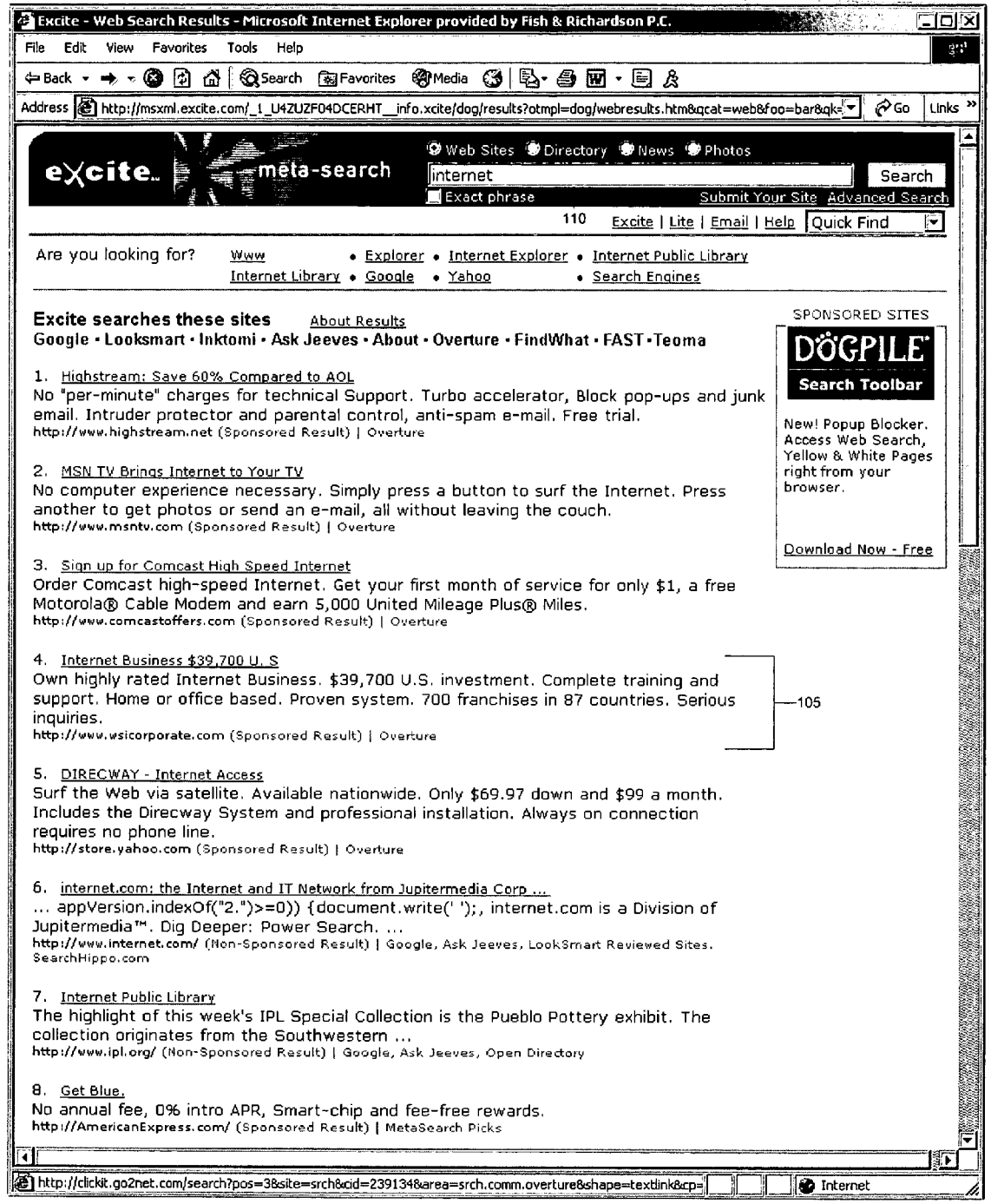

Search results returned by a search engine may be presented to a user with a description of characteristics of content corresponding to the search results. For example, a search result may be presented with an indication of whether the content corresponding to the search result is available for viewing. Similarly, a search result may be presented with an indication of whether the content corresponding to the search result is appropriate for a maturity level of the user. The indication may be prose near the presentation of the search result. The indication also may be one or more graphical icons near the presentation of the search result. The graphical icons may be selected to reveal text describing the characteristics of the corresponding search result.

Search results returned by a search engine may be sorted according to the characteristics of the search results. For example, the search results corresponding to available content may be presented before search results corresponding to unavailable content. Search results also may be filtered according to the characteristics of the search results. For example, search results corresponding to content that is inappropriate for minors may be omitted from a display of the search results.

Multiple methods exist for identifying the characteristics to be displayed or to be used as a basis for sorting or filtering search results. For example, a spider program collecting information on the contents of various web pages also may collect information regarding the characteristics of the web pages. In addition or as an alternative, if a search result has been viewed previously, a cached version of the search result may be used to identify the characteristics of the search result. Moreover, the web pages viewed by the user may be monitored to identify how the search results are used and the order in which the web pages are viewed. Characteristics may be determined by identifying people that have viewed the search results. If the search results have not been visited before identification as search results, the search results may be visited to determine their content characteristics after the search results are presented to the user.

Referring to FIGS. 1A-1E, conventional search engine interfaces present search results returned by a search engine. For example, one or more search results 105 may be returned by a search engine to match search criteria 110 entered by a user of the conventional search engine interface 100. Each search result 105 may be presented with a title that serves as a link to content corresponding to the search result. The search result 105 also may include a summary of the content corresponding to the search result, as well as an indication of the location of the content and a means for accessing pages related to the search result 105.

The user of the conventional search engine interface 100 references the information presented in the search result 105 while deciding whether to access the content associated with the search result. The summary may not accurately or completely describe the content, yet the user may find something included in the content or missing from the content that leads them to or away from accessing the content.

By supplementing the content summary with additional information regarding the content, the user may be better able to determine whether access is appropriate or desirable. For example, the user may be provided with information enabling their quick determination of whether the content corresponding to the search result 105 is unavailable, is inappropriate for minors, includes advertisements, includes or lacks multimedia content, has an unwanted file type, originates from an unwanted source, or has not been viewed by people known to the user. Better indication of the content associated with the search results may prevent the user from accessing unwanted content and enable the user to more quickly access the content being searched for with the conventional search engine interface 100.

Figure 2A:
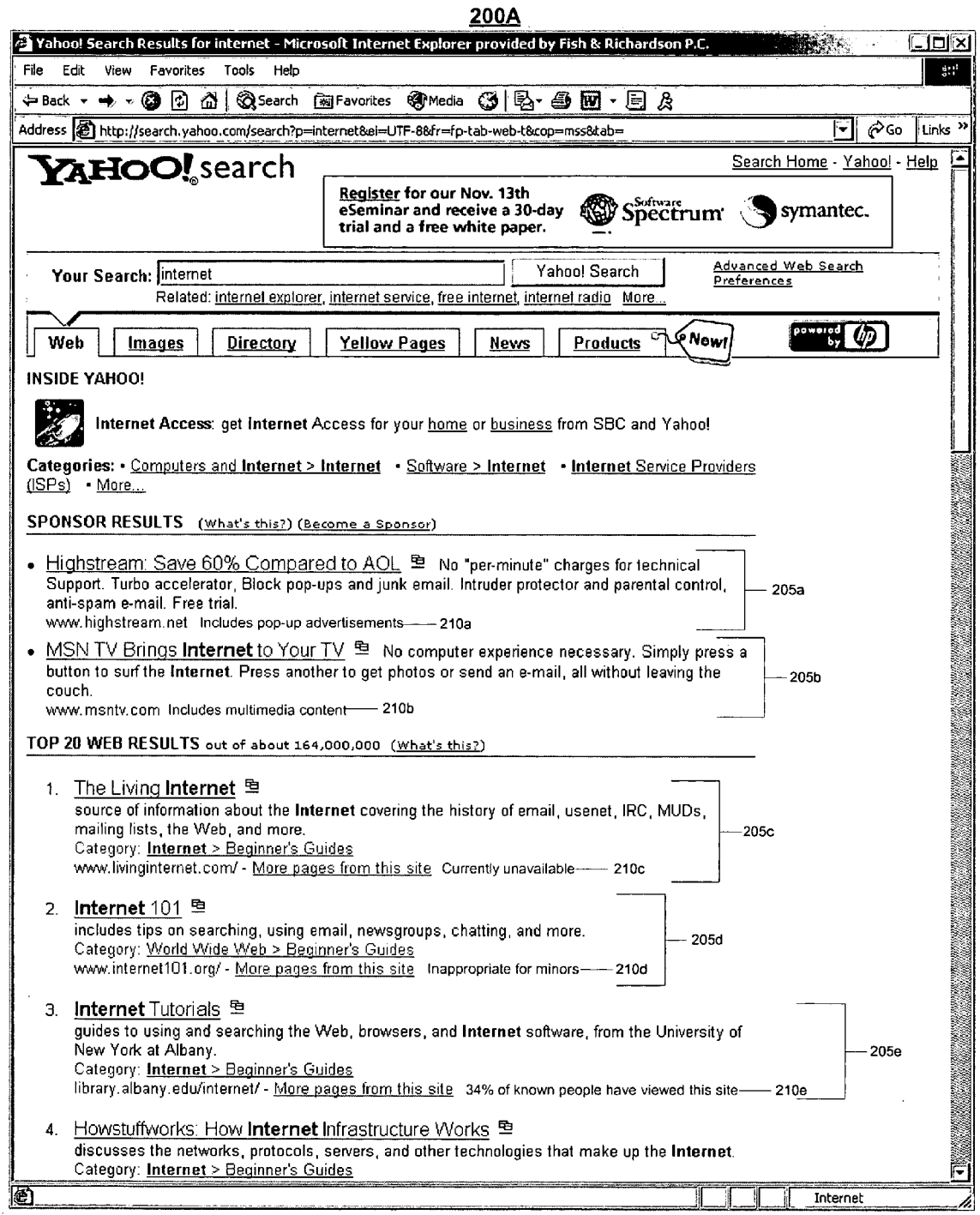
FIGS. 2A-2D are illustrations of search engine interfaces that display characteristics of content corresponding to search results returned by a search engine.

Referring to FIG. 2A, an updated search engine interface 200A provides additional information describing characteristics of content corresponding to search results presented to a user in the search engine interface 200A. Specifically, each search result 205a-e is presented with prose 210a-e that describes the characteristics of the content corresponding to the search result. For example, the search result 205c includes prose 210c that indicates that content corresponding to the search result 205c is currently unavailable. In one implementation, a cached version of the unavailable content corresponding to the search result 205c may be made available.

The prose 210a-e may indicate whether the content associated with the corresponding search results 205a-e is currently available. If the content is available, then the user may access the content without problem, but the user may not access the content when the content is unavailable. The prose 210a-e also may indicate whether the content is appropriate for certain ages. For example, prose 210d may inform the user that content associated with a search result 205d corresponding to the prose 210d is inappropriate for minors, or that the content is appropriate for minors.

In addition, the prose 210a-e may indicate whether displaying the content associated with the search results 205a-e leads to the display of advertisements. For example, prose 210a may inform the user that content associated with a search result 205a corresponding to the prose 210a spawns a pop-up advertisement, a pop-under advertisements, or rich media advertisements. A pop-up advertisement is an advertisement that appears in a window distinct from a window that includes main content that is viewed and removes window focus from the window that includes the main content. A pop-under advertisement also is an advertisement that appears in a window distinct from a window that includes main content that is viewed, but the window including pop-under advertisement appears below the window that includes the main content, and window focus remains on the window that includes the main content. A rich media advertisement is an advertisement that appears in a window that includes the main content to be viewed. The rich media advertisement may cover and obscure a part of the main content, which may be viewed after the rich media advertisement is manually dismissed.

The prose 210a-e may indicate the presence of multimedia content among the content associated with the search results 205a-e. Multimedia content includes audio content, video content, or other kinds of content other than text and images. For example, prose 210b may inform the user that content associated with a search result 205b corresponding to the prose 210b includes or does not include multimedia content. Furthermore, the prose 210a-e may indicate a file type included in content associated with a search results 205a-e corresponding to the prose 210a-e. For example, the prose 210a-e corresponding to the search result 205 may inform the user that the content associated with the search results 205a-e include, for example, a spreadsheet file, a presentation file, or a PDF file.

The prose 210a-e likewise may indicate a source of the content associated with the search results 205a-e. For example, prose 210a-e may inform the user that content associated with the search results 205a-e corresponding to the prose 210a-e came from, for example, a message board, a discussion forum, or a web page. The prose 210a-e also may indicate that people known to the user have viewed content corresponding to the search results 205a-e. For example, the prose 210e associated with the search result 205e may indicate the number or percentage of people from a list of people known to the user that have viewed the content corresponding to the search result 205. Another metric besides number or percentage of known people may be used to indicate that people known to the user have viewed the content associated with the search results 205a-e.

The people known to the user may include the user himself. The people known to the user also may include the people listed on a buddy list corresponding to the user. The people known to the user also may include people stored on buddy lists corresponding to people stored in the user's buddy list, and so on, up to a particular number of degrees of separation from the user. The people known to the user also may include all other users belonging to the domain of the user. The people known to the user may actively indicate that the content associated with the search results 205a-e has been viewed, or an automatic determination may be made as to whether the people known to the user have viewed the content corresponding to the search results 205a-e.

Figure 2B:
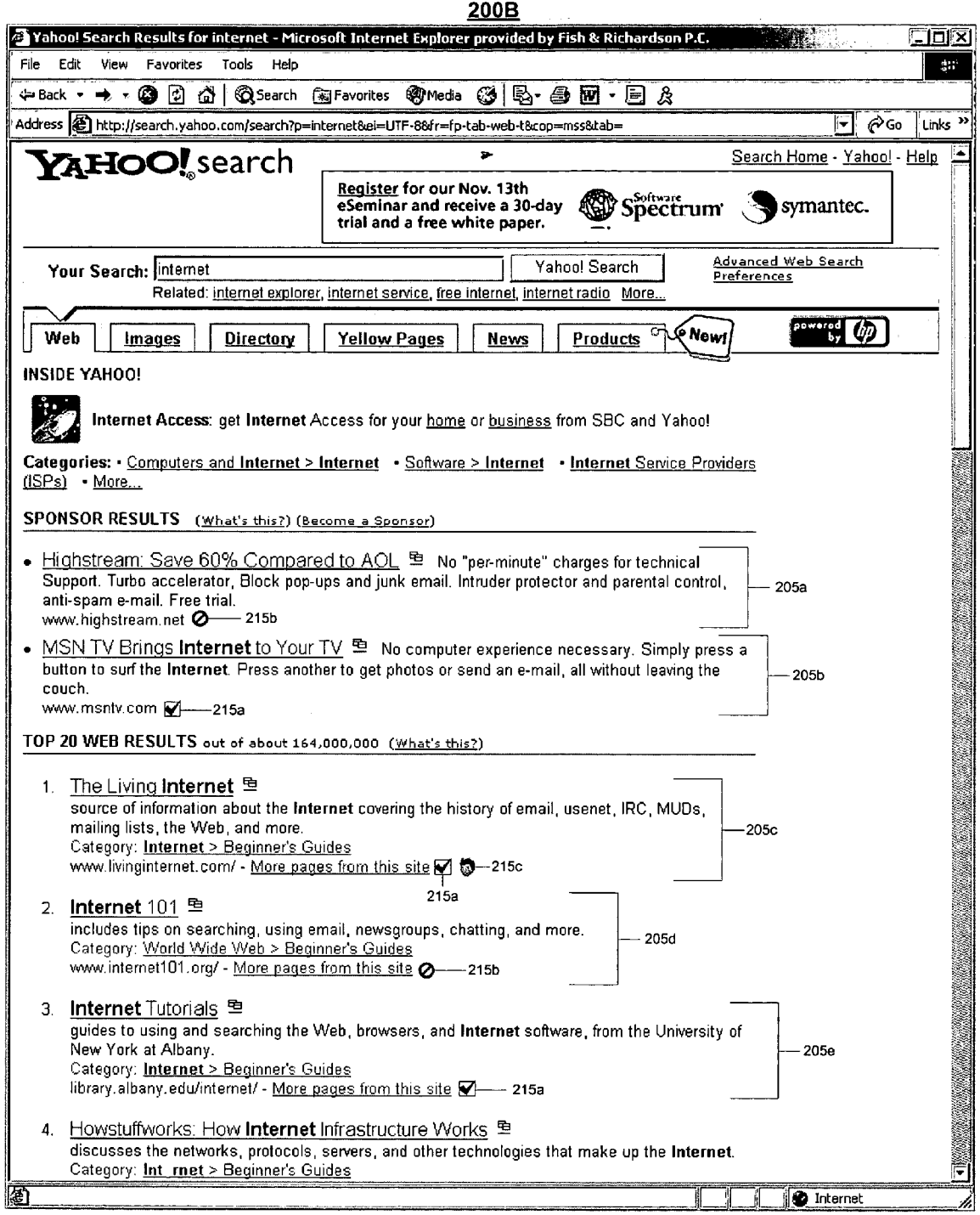

Referring to FIG. 2B, the search engine interface 200B also may describe characteristics of search results presented to a user in the search engine interface 200B using graphical icons 215a-c. Specifically, each search result 205a-e is presented with at least one, and potentially more than one, graphical icon 215a-c that indicates characteristics of the content corresponding to the search result 205a-e. Each icon 215a-c describes a characteristic of the content corresponding to the search result 205a-e for which the icon 215a-c is displayed. For example, the search result 205c includes an icon 215a that indicates that content corresponding to the search result 205c is currently available. Similarly, the icon 215b, included in the search result 205a, indicates that content corresponding to the search result for which the icon 215b is displayed is currently unavailable. The search result 205c also includes an icon 215c that informs the user that the content associated with the search result 205c is appropriate for minors. Other icons may be used to illustrate that content is inappropriate for minors, includes advertisements, includes multimedia content, lacks multimedia content, is of a certain file type, is from a particular source, or has been viewed by a certain number of people known to the user.

Figure 2C:
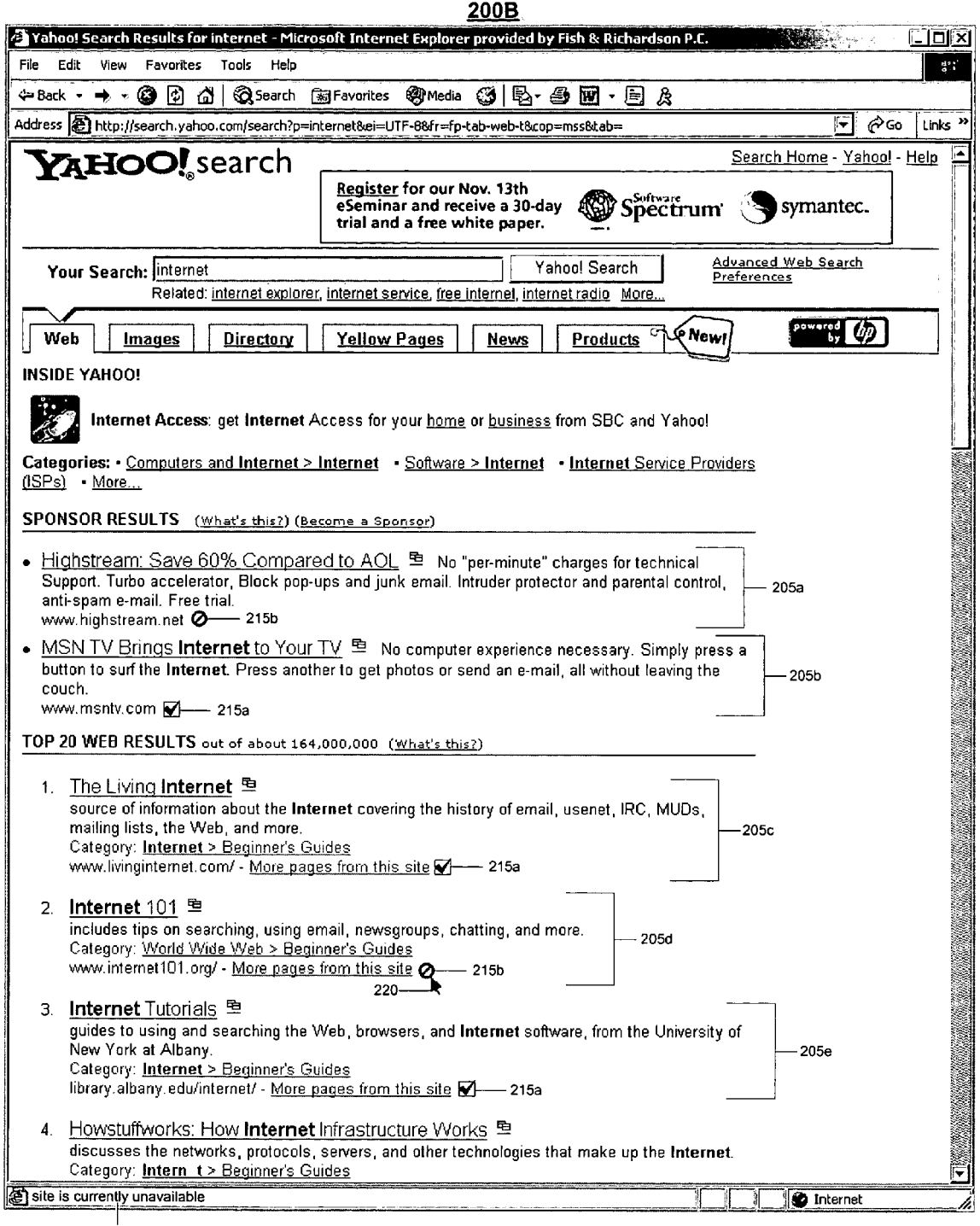
Figure 2D:
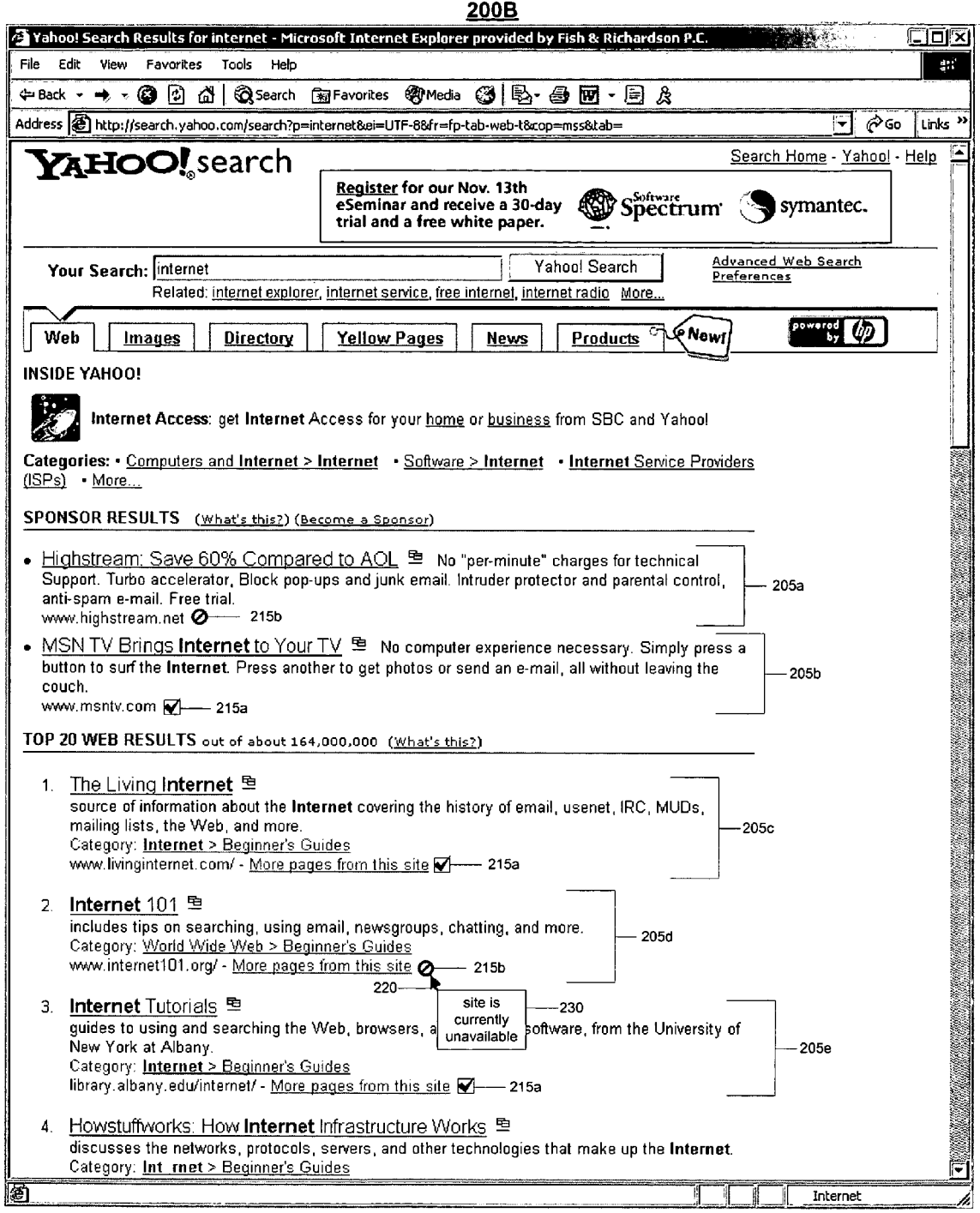

Referring to FIGS. 2C and 2D, the icons 215a-c may be selectable to reveal a description of the characteristics of the search results 205a-e indicated by the icons 215a-c. The description may include an explanation of the icon 215a-c as well as a detailed description of the characteristic and how a determination was made that the content for which the icon 215a-c is displayed has the characteristic represented by the icon 215a-c.

In one implementation, placing the mouse pointer 220 over an icon 215b included in the search result 205d reveals a description 225 of a characteristic of content corresponding to the search result 205d away from the search result 205d. Specifically, the icon 215b indicates that the search result 205d is unavailable, and the description 225 describes the icon 215b by saying that the content is currently unavailable. In another implementation, a mouse button may be clicked while the mouse pointer 220 is over the icon 215b to reveal the description 225.

In another implementation, placing the mouse pointer 220 over an icon 215b included in a search result 205d reveals a tool tip 230 that includes text describing a characteristic of content corresponding to the search result 205d. Specifically, the icon 215b indicates that the search result 215 is unavailable, and the text included in the tool tip 230 describes the icon 215b by saying that the content is currently unavailable. In another implementation, a mouse button may be clicked while the mouse pointer 215 is over the icon 215b to reveal the tool tip 230. In yet another implementation, the mouse pointer 220 may be held over the icon 215b for a period of time before the tool tip 230 is displayed.

Figure 2E:
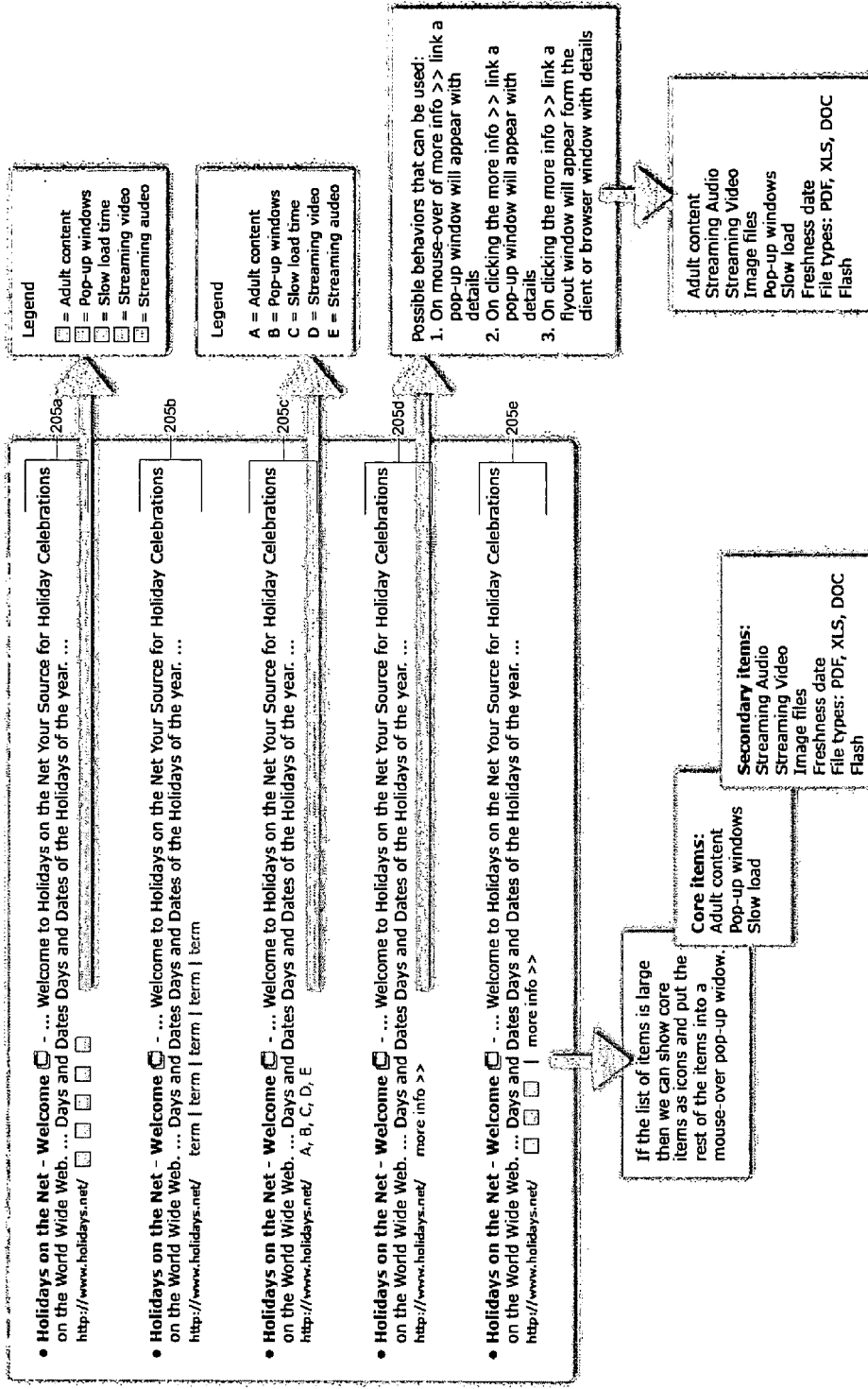

Referring to FIG. 2E, a search engine interface 200C also provides additional information describing characteristics of content corresponding to search results presented to a user in the search engine interface 200C. Each of the search results 205a-e is presented with an indication of the characteristics of the content corresponding to the search results 205a-e. The indications may be prose or graphical icons. Interaction may occur with the prose or the graphical icons to display additional information describing the characteristics of the content associated with the corresponding search results 205a-e.

Figure 3:
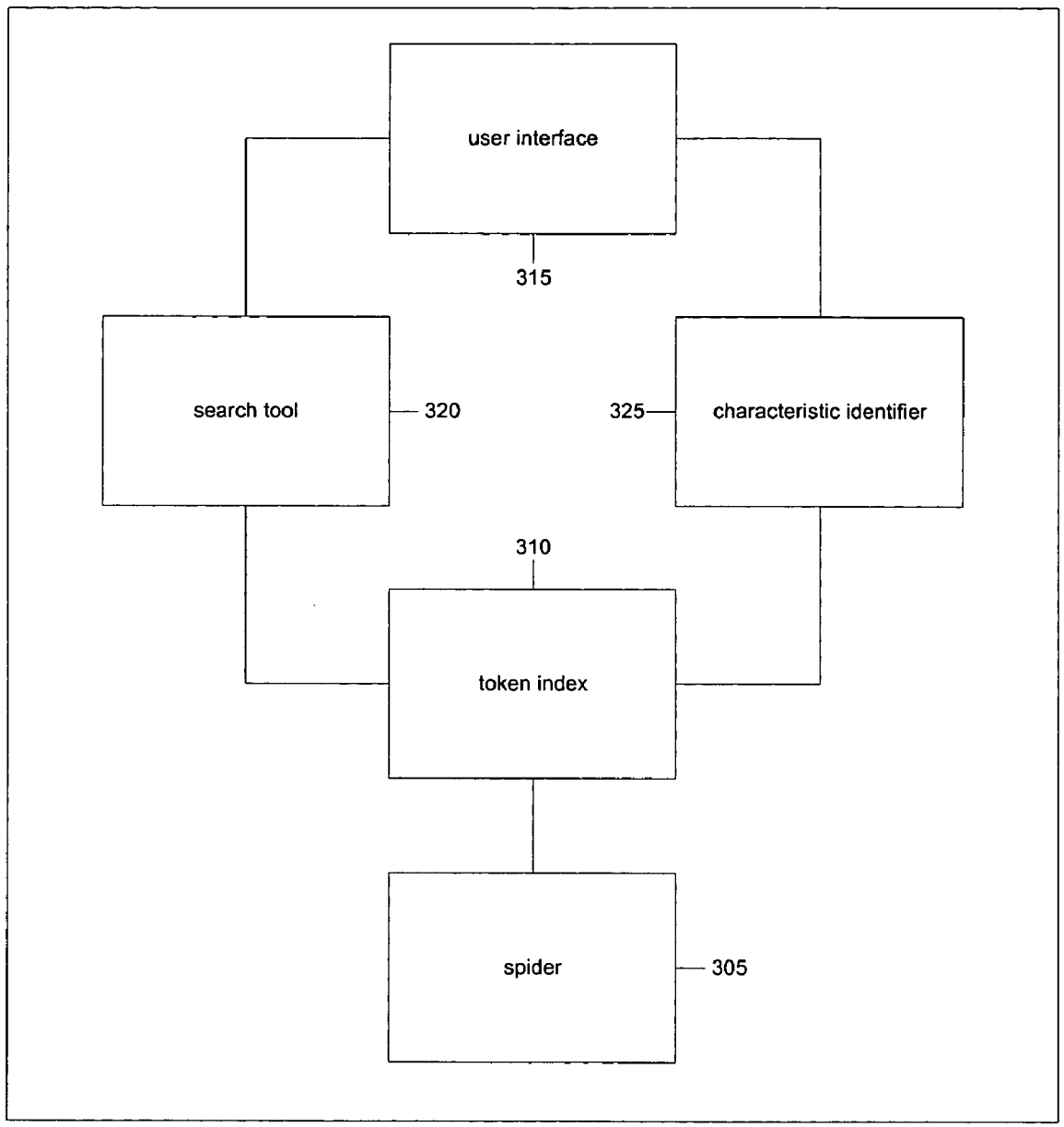
FIG. 3 is a block diagram of a search engine operable to identify characteristics of content corresponding to returned search results.

Referring to FIG. 3, a search engine 300 visits web pages to gather information that is helpful in returning search results that match entered search criteria. The search engine 300 also may gather information describing the content of the web pages visited for display when the visited web pages are identified as search results that match the search criteria. The search engine 300 includes a spider 305 that visits and gathers information from web pages in the form of tokens to be stored in a token index 310. The search engine also includes a user interface 315 to the search tool 320 that uses the information stored in the token index 310 to return search results, the characteristics of which are determined by a characteristic identifier 325.

In one implementation, the spider 305 starts at an initial web page and follows links included in the initial web page to access subsequent web pages. The spider 305 then accesses the web pages linked to by the subsequent web pages to access more web pages, and so on. When a web page is visited, the spider 305 generates text-based tokens to be stored in the token index 310. The tokens are stored in the token index 310 based on the web page for which the token was generated. The tokens may describe the contents of the web page as well as the characteristics of the contents of the web page. For example, tokens may be generated to describe if the content of the web page is available, the maturity level of the content, or the presence of advertisements within the content. In addition, tokens may be generated to indicate the presence of multimedia content within the content, the presence of a certain type of file within the content, the source of the content, or the people that have visited the web page.

The search engine 300 also includes a user interface 315 which may be used to enter search criteria. The user interface 315 passes the search criteria to a search tool 320, which searches the token index 310 to identify web pages that match the search criteria. The search tool 320 examines the tokens within the token index 310 that describe the contents of the web pages visited by the spider 305 to find the tokens that match the search criteria. The web pages corresponding to the matching tokens are returned by the search tool 320 to the user interface 315 as search results.

After the search results have been identified, the characteristic identifier 325 accesses the tokens from the token database 310 that correspond to the search results and that describe the characteristics of the content corresponding to the search results. The characteristic identifier 325 uses the accessed tokens to identify characteristics of the content associated with the search results. Indications of the identified characteristics are sent to the user interface 315 for display.

FIGS. 4A-4F are flow charts of characteristic identification processes 400A-F that may be used to identify characteristics of content corresponding to one or more search results. The characteristics identified as a result of the characteristic identification processes 400A-F may be displayed for a user of a search engine to better inform the user about the search results.

Referring to FIG. 4A, a characteristic identification process 400A gathers information describing the characteristics of potential search results as part of the preparation for identifying search results that match entered search criteria that is done. The gathered information is used to identify the characteristics of the identified search results. The characteristic identification process 400A includes visiting web pages to collect information on the web pages for use in returning the web pages as search results (402). The collected information describes the content of the page as well as characteristics of the content of the page. After the information has been collected, search criteria are received (404), and the collected information is used to identify search results matching the search criteria (406). The collected information describing the characteristics of content corresponding to the search results is retrieved (408), and that information is used to identify characteristics of content corresponding to the search results that are then displayed (410).

Referring to FIG. 4B, a characteristic identification process 400B identifies characteristics corresponding to search results after the search results have been identified. The characteristic identification process 400B includes receiving search criteria (412), and identifying search results that match the search criteria (414). Content corresponding to the search results search results is accessed (416). The accessed content is the content for which the characteristics are to be identified by the characteristic identification process 400B, so characteristics of the accessed content are determined (418). The characteristics may be determined from an external service, such as, for example, a ratings service that determines a maturity level for the accessed content.

Referring to FIG. 4C, a characteristic identification process 400C stores copies of web pages viewed by a user. The stored web pages are used to identify the characteristics of content corresponding to identified search results when content includes at least one of the stored web pages. The characteristic identification process 400C includes storing copies of web pages viewed by the user (420). Search criteria are received (422), and search results matching the search criteria are identified (424). Among the content corresponding to the search results may be one of the web pages of which a copy was stored by the user because the user previously viewed the web page. The stored copies of the visited web pages that are search results are retrieved (426), and the stored copies are used to identify characteristics of the content corresponding to the search results that are then displayed (428).

Referring to FIG. 4D, a characteristic identification process 400D monitors the web activity of a user to store information regarding how the user interacts with each of the pages viewed by the user. The information describing the use of the page may include the time spent viewing the page, the scrolling activity while viewing the page, information copied from the page, and information entered into forms on the page. The information describing how the user uses the pages aids in identifying the characteristics of the content of the pages when the pages are identified as search results. The characteristic identification process 400D includes monitoring a user's use of web pages (430). Information describing the user's use of the web pages is stored (432). Search criteria are received (434), and search results matching the search criteria are identified (436). Among the search results may be one of the web pages for which the user's use of the page was stored. The stored information regarding the user's use of the search results is retrieved (438). After retrieval, the stored information is used to identify characteristics of the search results that were previously viewed by he viewer (440).

Referring to FIG. 4E, a characteristic identification process 400E monitors the web activity of a user to identify the order in which the user views web pages. The information describing the order in which the user views the pages aids in identifying the characteristics of the content of the pages when the pages are identified as search results. The characteristic identification process 400E includes monitoring the order in which the user views web pages (442). Search criteria are received (444), and search results matching the search criteria are identified (446). Among the search results may be one of the web pages already viewed by the user. The stored information regarding the order in which the user views web pages is used to identify characteristics of the search results that were previously viewed by the viewer (448).

Referring to FIG. 4F, a characteristic identification process 400F identifies people known to a user that have viewed content corresponding to identified search results to determine characteristics of the content corresponding to the identified search results. The characteristic identification process 400F includes receiving search criteria (450), and identifying search results that match the search criteria (452). The people known to the user that have viewed the search results are identified (454). In one implementation, the people known to the user may be stored on a list that is manually or automatically maintained. Characteristics of content corresponding to the search results are identified based on opinions of the content of the people known to the user (456). For example, the people known to the user may record that content corresponding to the search results has been viewed. The people also may submit an opinion of the content. The opinions may be collected and examined to determine the characteristics of the content corresponding to the search results.

Figure 5:
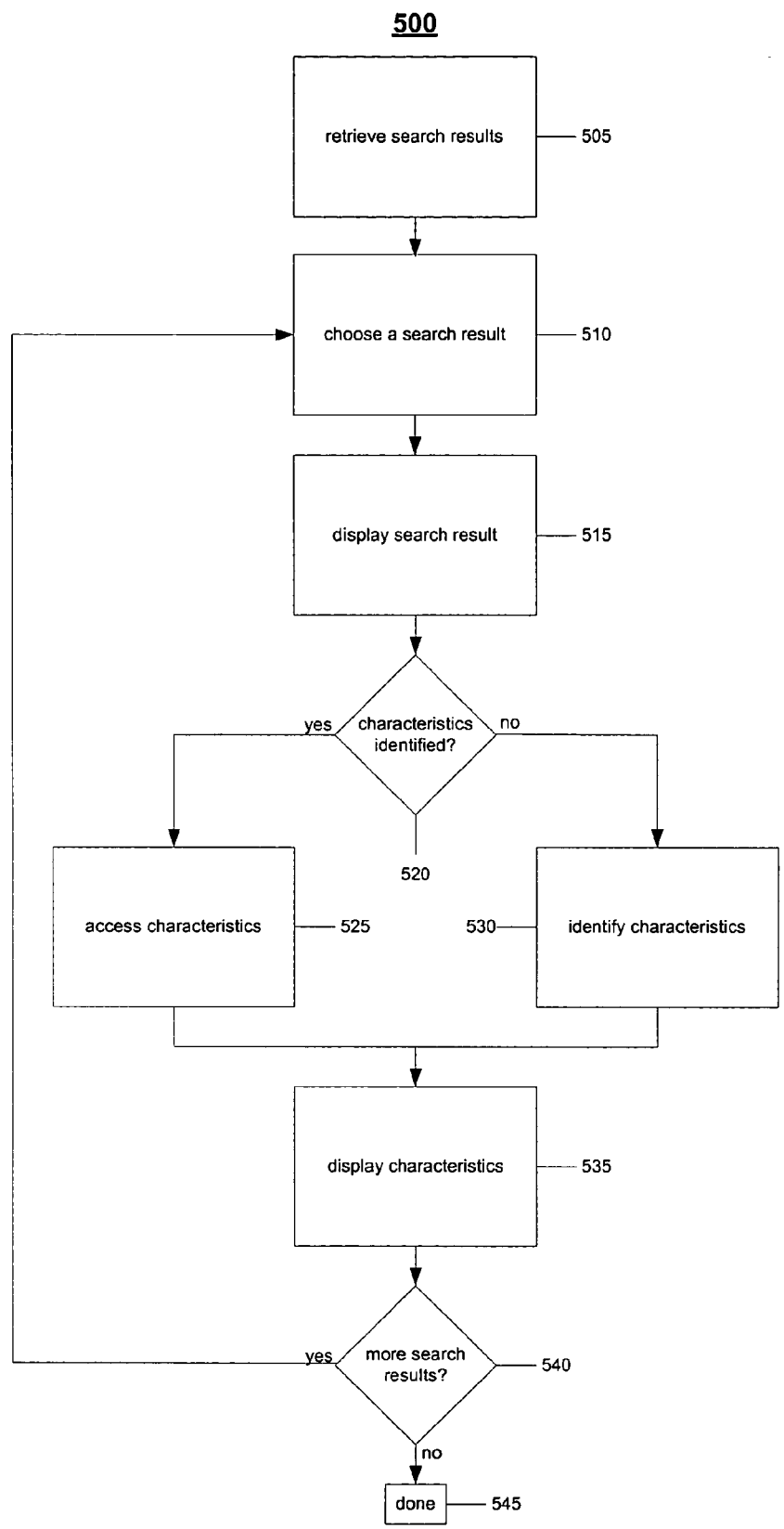
FIG. 5 is a flow chart of a process for displaying search results with characteristics of content corresponding to the search results.

Referring to FIG. 5, a search result display process 500 displays search results along with descriptions of the characteristics of content corresponding to the search results. The display process 500 includes retrieving search results (505). The search results are retrieved to match search criteria that have been entered. One of the search results is chosen (510), and the search result is displayed (515). In one implementation, displaying a search result may include displaying a title of the search result that also enables access to content corresponding to the link, as well as a summary of the content and an indication of the location of the content.

A determination is made as to whether characteristics of the content corresponding to the chosen search result have been identified (520). If the characteristics have been identified, then the characteristics are accessed (525). If the characteristics have not been identified, then the characteristics are identified (530). The accessed or identified characteristics are displayed (535). In one implementation, displaying the characteristics comprises displaying prose describing the characteristics near the search result, such as in the search engine interface 200A of FIG. 2A. In another implementation, displaying the characteristics comprises displaying one or more graphical icons representing the characteristics near the search results such as in the search engine interface 200B of FIG. 2B. The icons may be selected to reveal text describing the characteristics.

A determination is made as to whether more search results exist to be displayed (540). If so, the process of choosing a search result (510), displaying the search result (515), and displaying characteristics of content corresponding to the search result (535) is repeated. In this way, the search results and characteristics of content corresponding to the search results are sequentially displayed until there are no more search results to be displayed (540), at which point the display process 500 is complete (545).

Figure 6A:
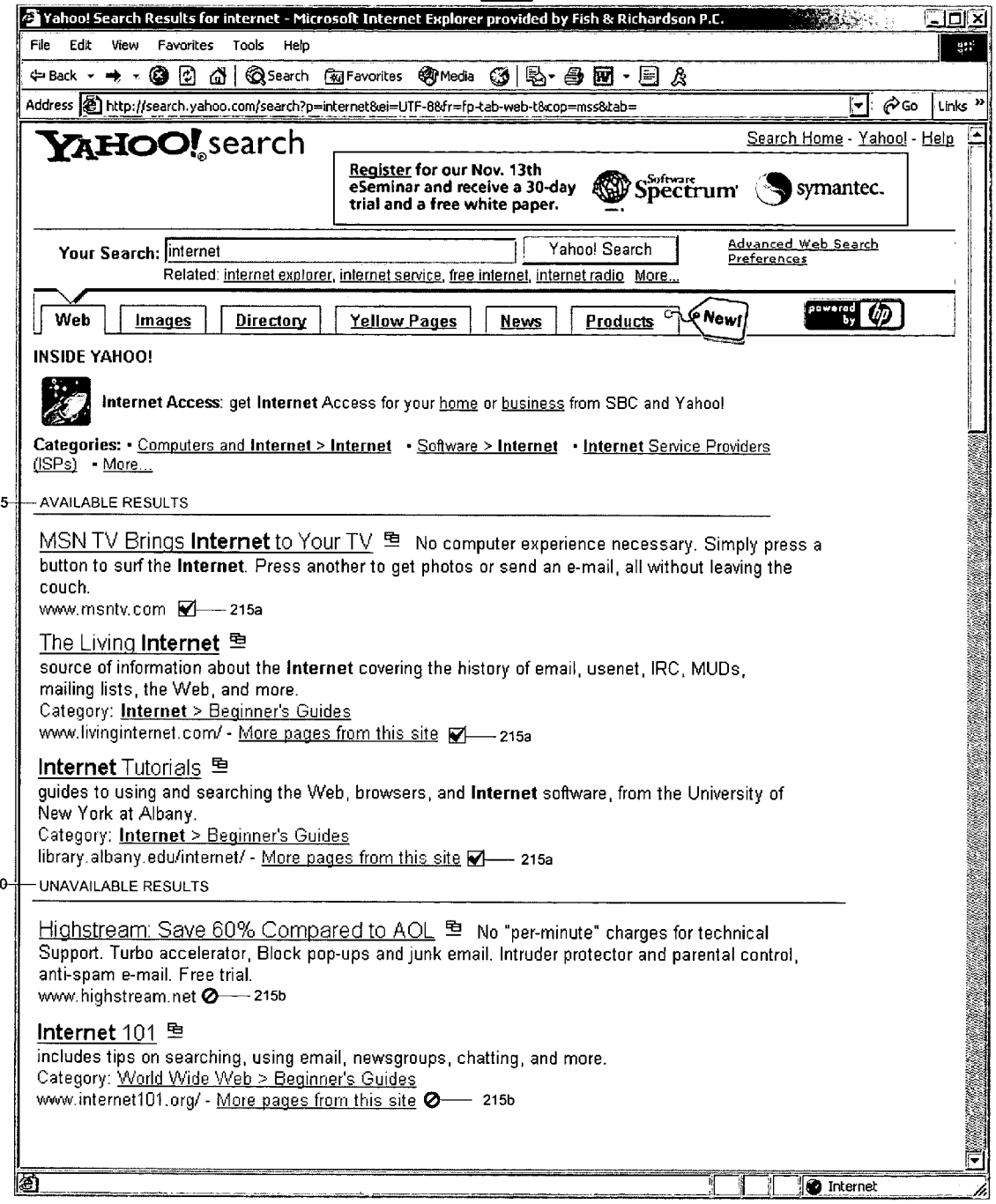
FIG. 6A is an illustration of a search engine interface in which search results are sorted according to characteristics of content corresponding to the search results.
Figure 6B:
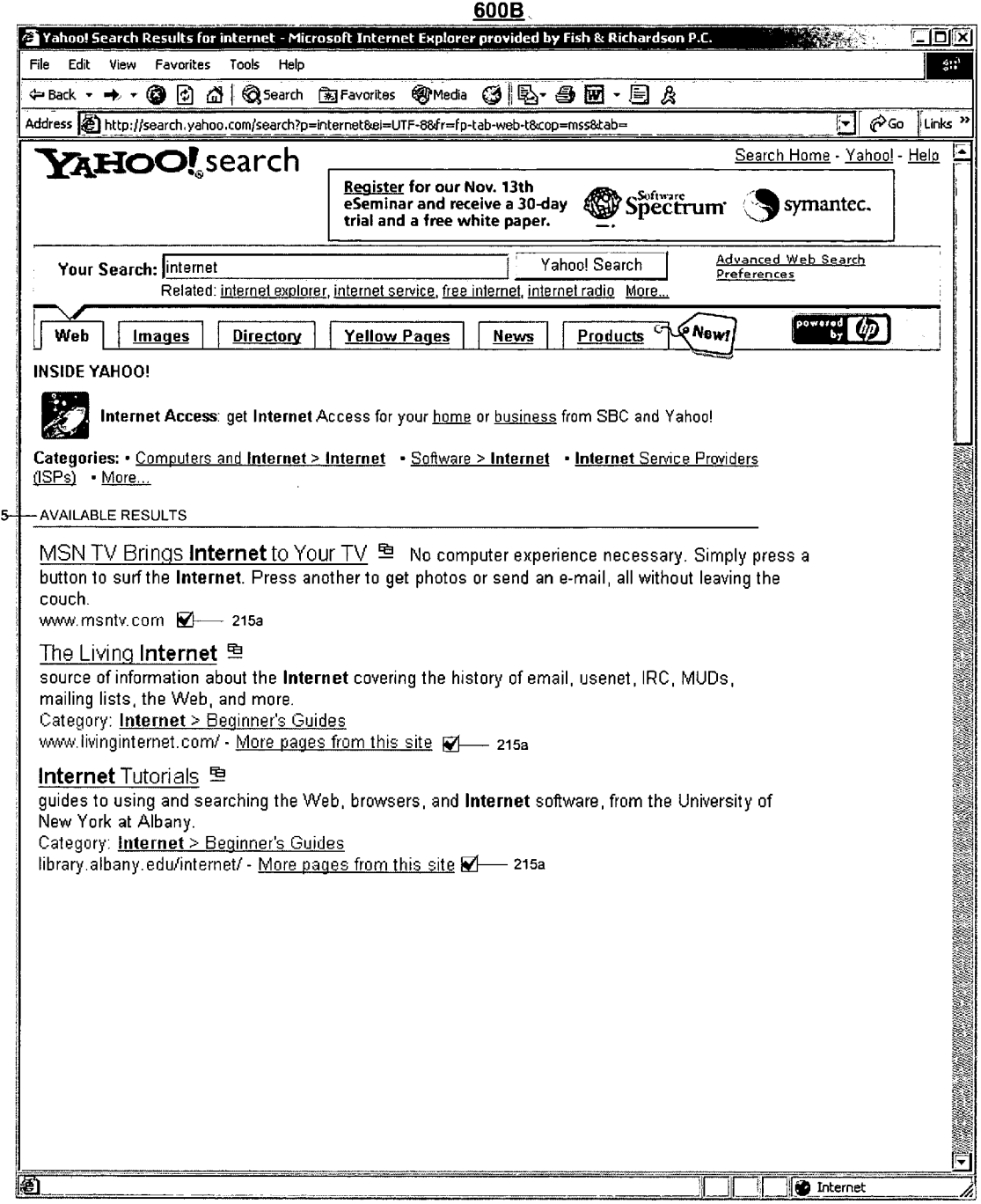
FIG. 6B is an illustration of a search engine interface in which search results are filtered according to characteristics of content corresponding to the search results.
Figure 7A:
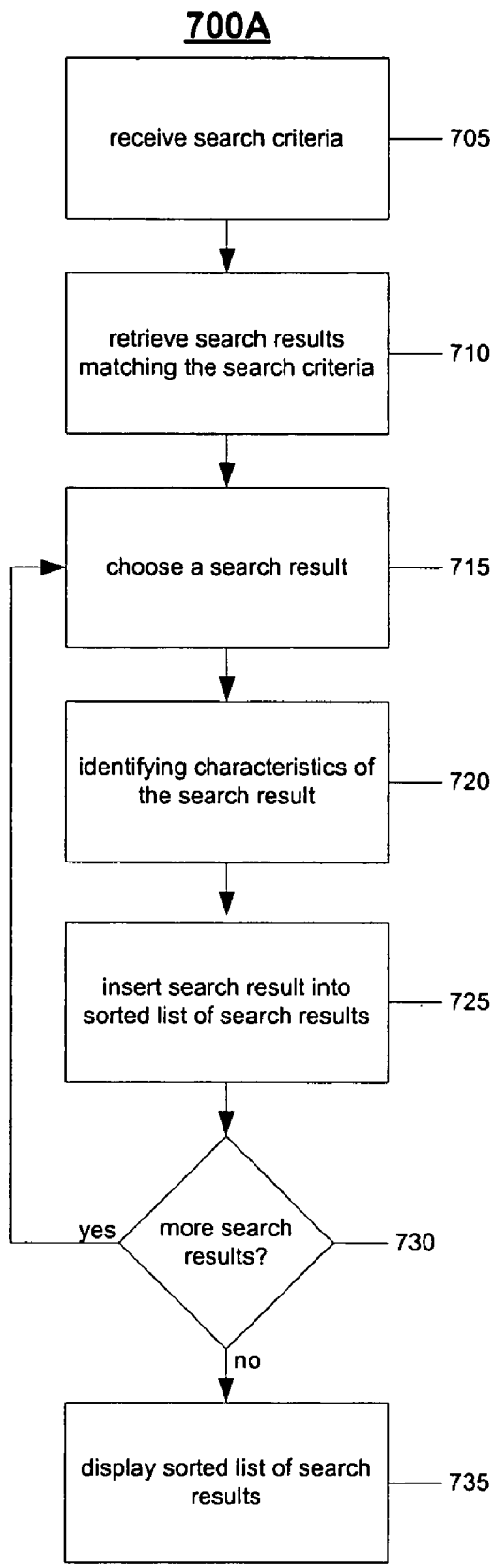
FIG. 7A is a flow chart of a process for sorting search results according to characteristics of content corresponding to the search results.
Figure 7B:
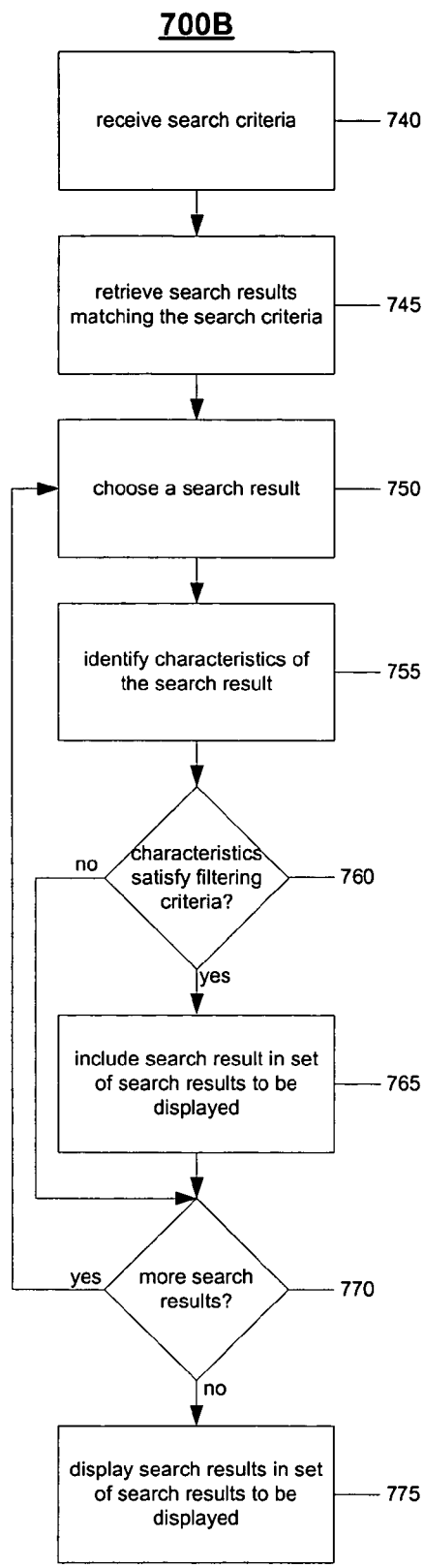
FIG. 7B is a flow chart of a process for filtering search results according to characteristics of content corresponding to the search results.
Figure 7C:
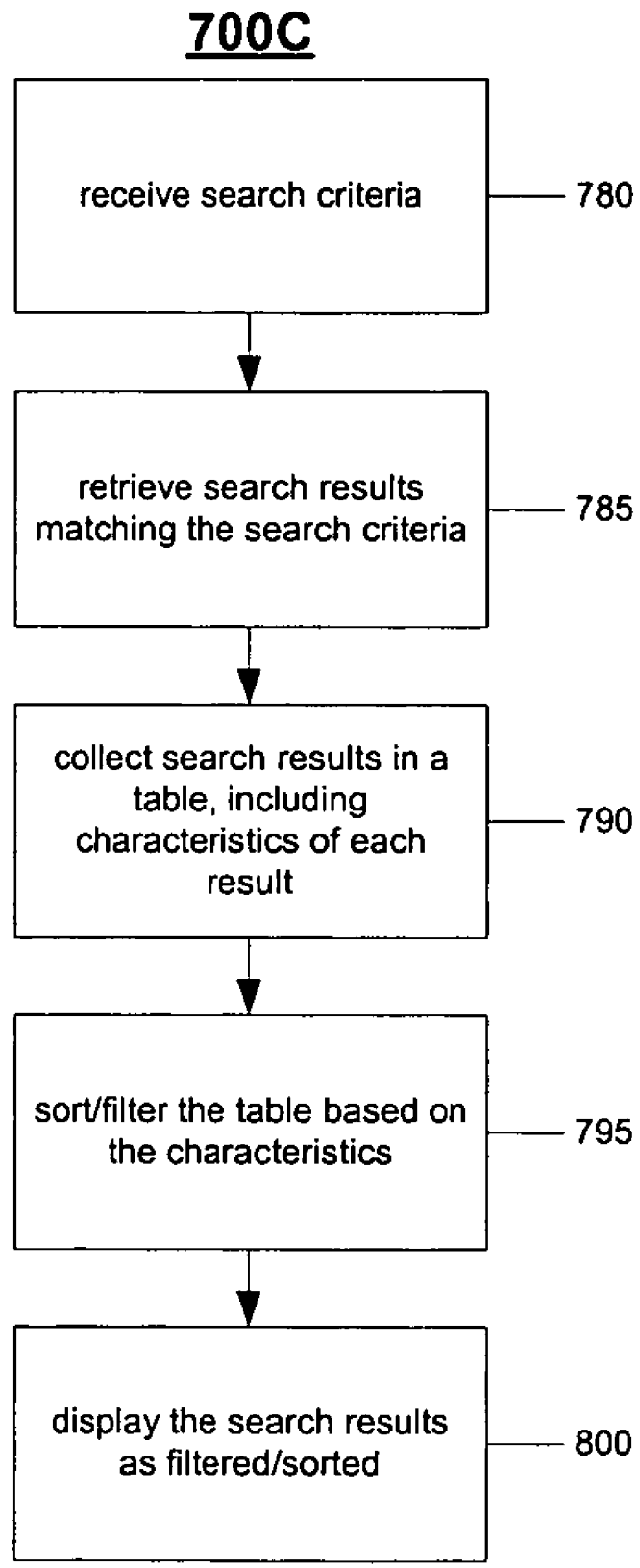
FIG. 7C is a flow chart of a process for sorting and/or filtering search results according to characteristics of content corresponding to the search results.

After characteristics corresponding to search results identified as matching entered search criteria have been identified, the search results may be sorted or filtered based on the characteristics. Sorting and filtering the search results enables a user to see first or only search results in which the user is interested. Sorting and filtering the search results also enables the user to see later or not at all search results in which the user is not interested. FIGS. 6A and 6B illustrate search engine interfaces in which search results are sorted and filtered, respectively. FIGS. 7A and 7B illustrate processes for sorting and filtering, respectively, search results based on the characteristics, and FIG. 7C illustrates an alternative process for sorting and/or filtering search results.

Referring to FIG. 6A, a search engine interface 600A includes search results that have been sorted based on the availability of content corresponding to the search results. The search engine interface 600A includes a heading 605 under which search results corresponding to content that is available are displayed. Each of the search results under the heading 605 corresponds to content that is available, as evidenced by the icon 215a included in each of the search results that is representative of search results with available content. Similarly, the search engine interface 600A includes a heading 610 under which search results corresponding to content that is unavailable are displayed. Each of the search results under the heading 610 corresponds to content that is unavailable, as evidenced by the icon 215b included in each of the search results that is representative of search results with unavailable content. Results corresponding to available content are displayed before results corresponding to unavailable content to bring attention first to the search results corresponding to available content.

The search engine interface 600A may sort the search results based on other characteristics of the content corresponding to the search results. Different headings 605 and 610 may be used to separate the search results into groups based on the characteristic used to sort the search results. For example, the search results may be sorted by required maturity level, and search results of one maturity level may be displayed before search results of another maturity level. Likewise, the search results may be sorted by type of advertisement included in the content, and search results including one type of advertisement may be displayed before search results with another type of advertisements. In addition, search results corresponding to content that does not include advertisements may be displayed before search results corresponding to content that does include advertisements.

The search results also may be sorted based on the presence of multimedia content, and search results corresponding to content that includes multimedia content may be displayed before search results corresponding to content that does not include multimedia content, or vice versa. The search results may be sorted based on file type of the content, and search results corresponding to content that includes one file type may be displayed before search results corresponding to content that includes another file type. The search results may be sorted based on a source of the content, and search results corresponding to content from one source may be displayed before search results corresponding to content from another source. The search results also may be sorted based on the number of people known to a user of the search engine interface 600A that have viewed the search results, and search results corresponding to content viewed by a particular number of known people may be displayed before search results corresponding to content viewed by another number of known people.

In one implementation, the search results may be sequentially sorted based on multiple characteristics. For example, the search results may be sorted on availability, presence of advertisements, and maturity level of the content associated with the search results to present search results corresponding to available content that does not include advertisements and that is appropriate for minors before any other search results are displayed.

Referring to FIG. 6B, a search engine interface 600B includes search results that have been filtered based on the availability of content corresponding to the search results. The search engine interface 600A includes a heading 605 under which search results corresponding to content that is available are displayed. Each of the search results under the heading 605 corresponds to content that is available, as evidenced by the icon 215a included in each of the search results that is representative of search results with available content. The search engine interface 600A purposefully omits from display search results corresponding to content that is unavailable. Results corresponding to available content are displayed to bring attention first to the search results corresponding to available content. Results corresponding to unavailable content are purposefully omitted to prevent bringing attention to search results corresponding to content that is unavailable.

The search engine interface 600B may filter the search results based on other characteristics of the content corresponding to the search results. For example, the search results may be filtered by required maturity level. In such a case, only search results of a particular maturity level may be displayed, and other search results may be purposefully omitted from display. Likewise, the search results may be filtered by type of advertisement included in the content, such that only search results with a certain type of advertisements, or without any advertisements, may be displayed, and other search results may be purposefully omitted from display.

The search results also may be filtered based on the presence of multimedia content, such that only search results with or without multimedia content may be displayed, and other search results may be purposefully omitted from display. The search results may be filtered based on file type of the content, such that only search results corresponding to content that includes a particular file type may be displayed, and other search results may be purposefully omitted from display. The search results may be filtered based on a source of the content, such that only search results corresponding to content from a particular source may be displayed, and other search results may be purposefully omitted from display. The search results also may be filtered based on the number of people known to a user of the search engine interface 600A that have viewed the search results, such that only search results corresponding to content viewed by more than an threshold number of known people may be displayed, and other search results may be purposefully omitted from display.

In one implementation, the search results may be sequentially filtered based on multiple characteristics. For example, the search results may be filtered on availability, presence of advertisements, and maturity level of the content associated with the search results to present only search results corresponding to available content that does not include advertisements and that is appropriate for minors and purposefully omitting other search results.

Referring to FIG. 7A, a sorting process 700A is used to sort search results for display on a search engine interface, such as the search engine interface 600A from FIG. 6A. The sorting process 700A includes receiving search criteria (705). Search results that match the received search criteria are retrieved (710). The retrieved search results are to be sorted before being displayed. One of the search results is chosen (715). Characteristics of content corresponding to the chosen search result are identified (720). For example, the processes 400A-F may be used to identify the characteristics of the content corresponding to the chosen search result. Based on the identified characteristics and the characteristics over which the search results are being sorted, the chosen search result is inserted into an appropriate location within a sorted list of search results, which is initially empty (725). The location in the sorted list of search results is determined such that the chosen search result is placed with other search results that have the same values for the characteristics over which the search results are sorted. If no other search results have the same value as the chosen search result, then the chosen search result is placed at the end of the sorted list of search results.

A determination is made as to whether there are more search results to be sorted (730). If so, a search result is chosen (715), characteristics of the search result are identified (720), and the search result is inserted into an appropriate location within the sorted list of search results (725). In this way, each of the search results is inserted into the sorted list of search results until there are no more search results to be sorted. When there are no more search results to be sorted (730), the sorted list of search results is displayed (735).

Referring to FIG. 7B, a filtering process 700B is used to filter search results for display on a search engine interface, such as the search engine interface 600B from FIG. 6B. The filtering process 700B includes receiving search criteria (740). Search results that match the received search criteria are retrieved (745). The retrieved search results are to be filtered before being displayed. One of the search results is chosen (750). Characteristics of content corresponding to the chosen search result are identified (755). For example, the processes 400A-F may be used to identify the characteristics of the content corresponding to the chosen search result. Based on the identified characteristics and the characteristic being used to filter the search results, a determination is made as to whether the chosen search result satisfies filtering criteria (760). The filtering criteria define the values of the characteristics that are necessary for the search result to be displayed. If the chosen search result satisfies the filtering criteria, then the chosen search result is included in a set of search results to be displayed (765). If the chosen search result does not satisfy the filtering criteria, then the chosen search result is not placed in the set of search results to be displayed.

A determination is made as to whether there are more search results to be filtered (770). If so, a search result is chosen (750), characteristics of the search result are identified (755), and the search result is included in the set of search results to be displayed (765) if the search result satisfies the filtering criteria (760). In this way, each of the search results is included in the filtered set of search results, if the content corresponding to the search result satisfies the filtering criteria, until there are no more search results to be filtered. When there are no more search results to be filtered (770), the filtered list of search results is displayed (775).

Referring to FIG. 7C, an alternative sorting and filtering process 700C may be used to sort and/or filter search results for display on a search engine interface. The sorting process 700C includes receiving search criteria (780). Search results that match the received search criteria are retrieved (785). The retrieved search results are to be sorted and/or filtered before being displayed. The search results are collected in a table along with characteristics of content associated with the search results (790). The table is sorted and filtered based on the characteristics being used to sort and filter the search the results (795). The contents of the table, which are the search results, are then displayed as sorted and filtered (800).

Presenting search results returned by a search engine to the user with a description of characteristics of content corresponding to the search results provides more information to the user, which helps the user to find that which is being searched for. The user may therefore avoid accessing search results that are offensive or otherwise undesirable. Presenting a description of the characteristics also enables the user to avoid accessing search results with advertisements. Presenting a description of the characteristics also enables the user to identify search results that are popular among people known to the user or among other users belonging to the domain of the user.

A number of implementations of the invention have been described. Nevertheless, it will be understood that various modifications may be made without departing from the spirit and scope of the invention. For example, the term web page is used throughout for clarity of description. However, the characteristics of any Internet resource may be displayed to provide a better understanding of the contents of the Internet resource. An Internet resource is any local or remote resource that satisfies the search criteria entered.

As another example, similar methodologies of describing the characteristics of content accessible with a link may be used for any link that is displayed or encountered, even those presented outside the context of a search environment. For example, any web page or e-mail message that includes or references a link also would show a description of the characteristics of content that may be accessed with the link. In such a case, the description of the characteristics of the content may be done by the provider (i.e., publisher) of the content.

Accordingly, other implementations are within the scope of the following claims.

What is claimed is:

1. A search tool graphical user interface, comprising:
   search criteria provided by a user as user input to the search tool;
   a list of search results including links to content identified by the search tool in performing a search routine based on the search criteria provided by the user as user input to the search tool, the list of search results including a first search result that includes a first link to content that is currently unavailable through invocation of the first link and a second search result that includes a second link to content that is currently available through invocation of the second link; and
   an indicator corresponding to the first search result and providing a perceivable indication that invocation of the first link will not presently access, at an address associated with the first link, content corresponding to the address.

2. The search tool graphical user interface of claim 1 wherein the indicator includes a textual message displayed proximate to the first search result in the list of search results.

3. The search tool graphical user interface of claim 1 wherein the indicator includes a graphical icon displayed proximate to the first search result in the list of search results.

4. The search tool graphical user interface of claim 3 wherein the icon is selectable to reveal text describing that content associated with the first link is currently unavailable.

5. The search tool graphical user interface of claim 1 wherein the search results are grouped based on availability of content associated with the search results such that search results with links to content that is currently unavailable are grouped in a first group, including the first search result, and search results with links to content that is currently available are grouped in a second group, including the second search result, the first group of search results and second group of search results being displayed to distinguish the first group of search results from the second group of search results.

6. The search tool graphical user interface of claim 5 further comprising:
   a first heading that identifies the first group of search results as search results with links to content that is currently unavailable; and
   a second heading that identifies the second group of search results as search results with links to content that is currently available.

7. A search tool graphical user interface, comprising:
   search criteria provided by a user as user input to the search tool;
   a list of search results including links to content identified by the search tool in performing a search routine based on the search criteria provided by the user as user input to the search tool, the list of search results including a first search result that includes a first link to content determined to be inappropriate for a first age-based level and a second search result that includes a second link to content determined to be appropriate for the first age-based level; and
   an indicator corresponding to the first search result and providing a perceivable indication of a determination, other than content accessed at an address associated with the first link, that content associated with the first link is inappropriate for the first age-based level.

8. The search tool graphical user interface of claim 7 wherein the indicator includes a textual message displayed proximate to the first search result in the list of search results.

9. The search tool graphical user interface of claim 7 wherein the indicator includes a graphical icon displayed proximate to the first search result in the list of search results.

10. The search tool graphical user interface of claim 9 wherein the icon is selectable to reveal text describing that the content associated with the first link has been determined to be inappropriate for the first age-based level.

11. The search tool graphical user interface of claim 7 wherein the search results are grouped based on the age-based level associated with the search results such that search results with links to content that is determined to be inappropriate for the first age-based level are grouped in a first group, including the first search result, and search results with links to content that is determined to be appropriate for the first age-based level are grouped in a second group, including the second search result, the first group of search results and second group of search results being displayed to distinguish the first group of search results from the second group of search results.

12. The search tool graphical user interface of claim 11 further comprising:
   a first heading that identifies the first group of search results as search results with links to content that is determined to be inappropriate for the first age-based level; and
   a second heading that identifies the second group of search results as search results with links to content that is determined to be appropriate for the first age-based level.

13. The search tool graphical user interface of claim 1 wherein the perceivable indication that invocation of the first link will not presently access, at the address associated with the first link, content corresponding to the address includes a perceivable indication of a lack of ability of the first link to generate content associated with the first link in response to user selection of the first link.

14. The search tool graphical user interface of claim 1 wherein the perceivable indication that invocation of the first link will not presently access, at the address associated with the first link, content corresponding to the address includes a perceivable indication of a lack of ability of the first link to generate any content associated with the first link in response to user selection of the first link.

15. The search tool graphical user interface of claim 1 wherein the perceivable indication that invocation of the first link will not presently access, at the address associated with the first link, content corresponding to the address includes a perceivable indication that content accessible at an address associated with the first link is not accessible at a time of display of the perceivable indication.

16. The search tool graphical user interface of claim 1 wherein the perceivable indication that invocation of the first link will not presently access, at the address associated with the first link, content corresponding to the address includes a perceivable indication that content served by a remote server identified by the address associated with the first link is not available for service at a time of display of the perceivable indication.

17. The search tool graphical user interface of claim 1 wherein the perceivable indication that invocation of the first link will not presently access, at the address associated with the first link, content corresponding to the address includes a perceivable indication that content associated with the first link is unavailable at a time when the search tool performs the search routine.

18. The search tool graphical user interface of claim 1 wherein the indicator is a first indicator, the search tool graphical user interface further comprising:
    a second indicator corresponding to the second search result and providing a perceivable indication that content associated with the second link is currently available through invocation of the second link.

19. The search tool graphical user interface of claim 18 wherein the second indicator includes a textual message displayed proximate to the second search result in the list of search results.

20. The search tool graphical user interface of claim 18 wherein the second indicator includes a graphical icon displayed proximate to the second search result in the list of search results.

21. The search tool graphical user interface of claim 18 wherein:
    the first indicator includes a first graphical icon displayed proximate to the first search result in the list of search results,
    the second indicator includes a second graphical icon displayed proximate to the second search result in the list of search results, and
    the first graphical icon has a different display than the second graphical icon.

22. The search tool graphical user interface of claim 21 wherein the first graphical icon is displayed in a first color and the second graphical icon is displayed in a second color that is different than the first color.

23. The search tool graphical user interface of claim 21 wherein the first graphical icon is displayed in a first shape and the second graphical icon is displayed in a second shape that is different than the first shape.

24. The search tool graphical user interface of claim 18 wherein:
    a display of the first search result in the list of search results includes a first title of the first search result, a first summary of the first search result, a first uniform resource locator associated with the first link, and the first indicator, and
    a display of the second search result in the list of search results includes a second title of the second search result, a second summary of the second search result, a second uniform resource locator associated with the second link, and the second indicator.

25. The search tool graphical user interface of claim 7 wherein the perceivable indication of the determination that content associated with the first link is inappropriate for the first age-based level includes a perceivable indication of a determination that content associated with the first link is inappropriate for minors.

26. The search tool graphical user interface of claim 7 wherein the indicator is a first indicator, the search tool graphical user interface further comprising:
    a second indicator corresponding to the second search result and providing a perceivable indication of a determination, other than content accessed at an address associated with the second link, that content associated with the second link is appropriate for the first age-based level.

27. The search tool graphical user interface of claim 26 wherein:
    the perceivable indication of the determination that content associated with the first link is inappropriate for the first age-based level includes a perceivable indication of a determination that content associated with the first link is inappropriate for minors, and
    the perceivable indication of the determination that content associated with the second link is appropriate for the first age-based level includes a perceivable indication of a determination that content associated with the second link is appropriate for minors.

28. The search tool graphical user interface of claim 26 wherein:
    a display of the first search result in the list of search results includes a first title of the first search result, a first summary of the first search result, a first uniform resource locator associated with the first link, and the first indicator, and
    a display of the second search result in the list of search results includes a second title of the second search result, a second summary of the second search result, a second uniform resource locator associated with the second link, and the second indicator.

29. A search tool graphical user interface, comprising:
    search criteria provided by a user as user input to the search tool;
    a list of search results including links to content identified by the search tool in performing a search routine based on the search criteria provided by the user as user input to the search tool, the list of search results including a first search result that includes a first link to first content and a second search result that includes a second link to second content;
    a first indicator corresponding to the first search result and providing a perceivable indication of a first metric related to the first content, the first metric being determined based at least in part on a numerical representation corresponding to viewings of the first content by people that are associated with the user; and
    a second indicator corresponding to the second search result and providing a perceivable indication of a second metric related to the second content, the second metric being determined based at least in part on a numerical representation corresponding to viewings of the second content by people that are associated with the user,
    wherein the second indicator is different than the first indicator and, when compared to the first indicator, the second indicator indicates that less people associated with the user have viewed the second content than the first content.

30. The search tool graphical user interface of claim 29 wherein:

the first indicator includes a textual message displayed proximate to the first search result in the list of search results, and the second indicator includes a textual message displayed proximate to the second search result in the list of search results.

31. The search tool graphical user interface of claim 29 wherein the first search result that includes the first indicator is grouped in a first group of search results and the second search result that includes the second indicator is grouped in a second group of search results, the first group of search results and second group of search results being displayed to distinguish the first group of search results from the second group of search results.

32. The search tool graphical user interface of claim 29 wherein:

the first indicator includes a first number indicating a percentage of people that are associated with the user and have viewed the first content, and the second indicator includes a second number indicating a percentage of people that are associated with the user and have viewed the second content, the first number indicating a higher percentage than the second number.

33. The search tool graphical user interface of claim 29 wherein:

the first indicator includes a first number indicating a total number of people that are associated with the user and have viewed the first content, and the second indicator includes a second number indicating a total number of people that are associated with the user and have viewed the second content, the first number being higher than the second number.

34. The search tool graphical user interface of claim 29 wherein the people associated with the user that are used in determining the first metric and the second metric include people identified on a list associated with the user.

35. The search tool graphical user interface of claim 34 wherein the list associated with the user includes a buddy list maintained by the user.

36. The search tool graphical user interface of claim 35 wherein the buddy list is associated with a personal messaging communication application used by the user.

37. The search tool graphical user interface of claim 34 wherein the people associated with the user that are used in determining the first metric and the second metric further include people identified on lists associated with each of the people identified by the list associated with the user.

38. The search tool graphical user interface of claim 37 wherein the list associated with the user includes a buddy list maintained by the user and the lists associated with each of the people identified by the buddy list maintained by the user include buddy lists maintained by each of the people identified by the buddy list maintained by the user.

39. The search tool graphical user interface of claim 29 wherein the people associated with the user that are used in determining the first metric and the second metric include all other users belonging to a domain of the user.

* * * * *